(12) United States Patent
Maeda

(10) Patent No.: US 7,830,058 B2
(45) Date of Patent: Nov. 9, 2010

(54) SURFACE MAGNET TYPE MOTOR, FABRICATION METHOD OF SURFACE MAGNET TYPE MOTOR, AND INTERNAL COMBUSTION ENGINE WITH SURFACE MAGNET TYPE MOTOR

(75) Inventor: Tomoyuki Maeda, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 543 days.

(21) Appl. No.: 11/666,754

(22) PCT Filed: Nov. 8, 2005

(86) PCT No.: PCT/JP2005/020787

§ 371 (c)(1),
(2), (4) Date: May 2, 2007

(87) PCT Pub. No.: WO2006/051934

PCT Pub. Date: May 18, 2006

(65) Prior Publication Data

US 2008/0111435 A1    May 15, 2008

(30) Foreign Application Priority Data

Nov. 15, 2004   (JP) ............................. 2004-330023

(51) Int. Cl.
*H02K 1/27* (2006.01)
*H02K 15/03* (2006.01)
(52) U.S. Cl. .................................... 310/156.28; 29/598
(58) Field of Classification Search ..............................
310/156.01–156.84, 86, 262, 261; 29/598

See application file for complete search history.

(56) References Cited

U.S. PATENT DOCUMENTS

| 4,939,398 | A | * | 7/1990 | Lloyd | 310/156.53 |
|---|---|---|---|---|---|
| 5,121,605 | A | * | 6/1992 | Oda et al. | 60/608 |
| 5,363,004 | A | | 11/1994 | Futami et al. | |
| 6,661,145 | B1 | * | 12/2003 | Nilson | 310/156.22 |
| 2002/0140308 | A1 | * | 10/2002 | Inayama et al. | 310/156.47 |

FOREIGN PATENT DOCUMENTS

| JP | 02184232 A | * | 7/1990 |
|---|---|---|---|
| JP | 03-011950 A | | 1/1991 |
| JP | 04-183238 A | | 6/1992 |
| JP | 05-284680 A | | 10/1993 |
| JP | 10-080081 A | | 3/1998 |
| JP | 2001-025193 A | | 1/2001 |
| JP | 2001-508997 A | | 7/2001 |
| JP | 2001-218403 A | | 8/2001 |
| JP | 2001-513315 A | | 8/2001 |
| JP | 2002-010543 A | | 1/2002 |
| JP | 2004-129369 A | | 4/2004 |
| WO | WO 98/33260 A1 | | 7/1998 |
| WO | WO 98/34324 | | 8/1998 |
| WO | WO 9834324 A1 | * | 8/1998 |

* cited by examiner

*Primary Examiner*—Quyen Leung
*Assistant Examiner*—Eric Johnson
(74) *Attorney, Agent, or Firm*—Kenyon & Kenyon LLP

(57) ABSTRACT

A surface magnet type motor having a magnet at a surface of a rotor includes an anti-scattering tube formed in a cylindrical configuration longer in length than the magnet of the rotor in the axial direction, having the magnet press-fitted inside to prevent scattering of the magnet. A stress alleviation portion is provided to alleviate stress generated at an end of the magnet press-fitted into the anti-scattering tube.

18 Claims, 13 Drawing Sheets

FIG. 3
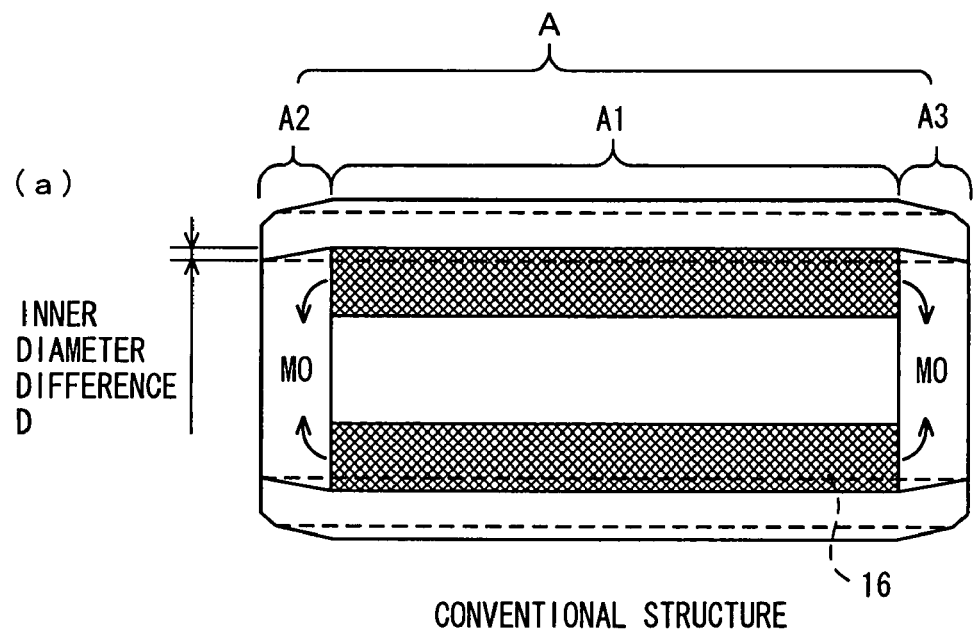
(a) CONVENTIONAL STRUCTURE
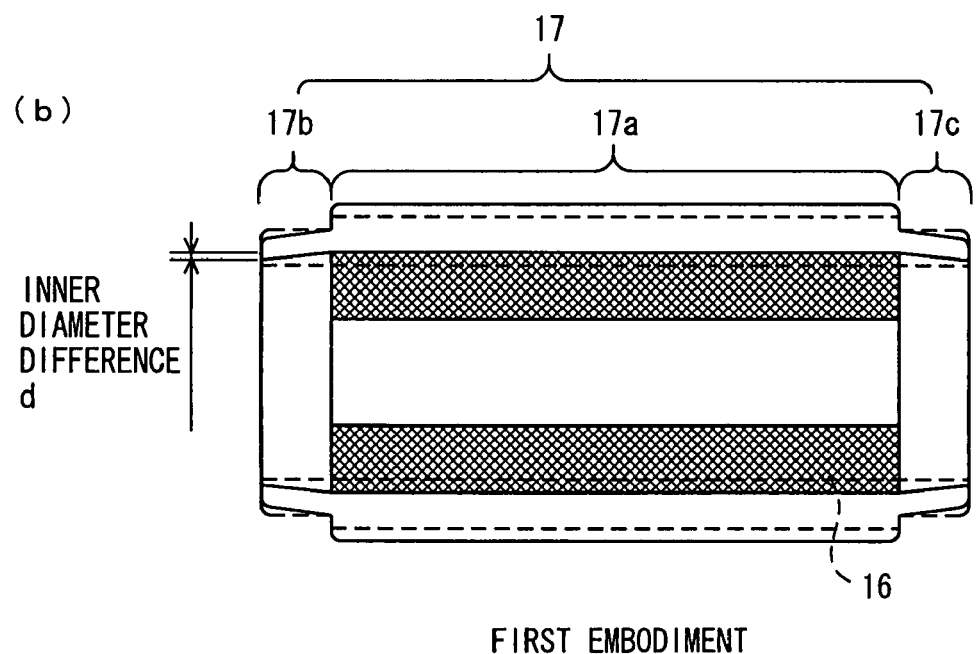
(b) FIRST EMBODIMENT

FIG. 6
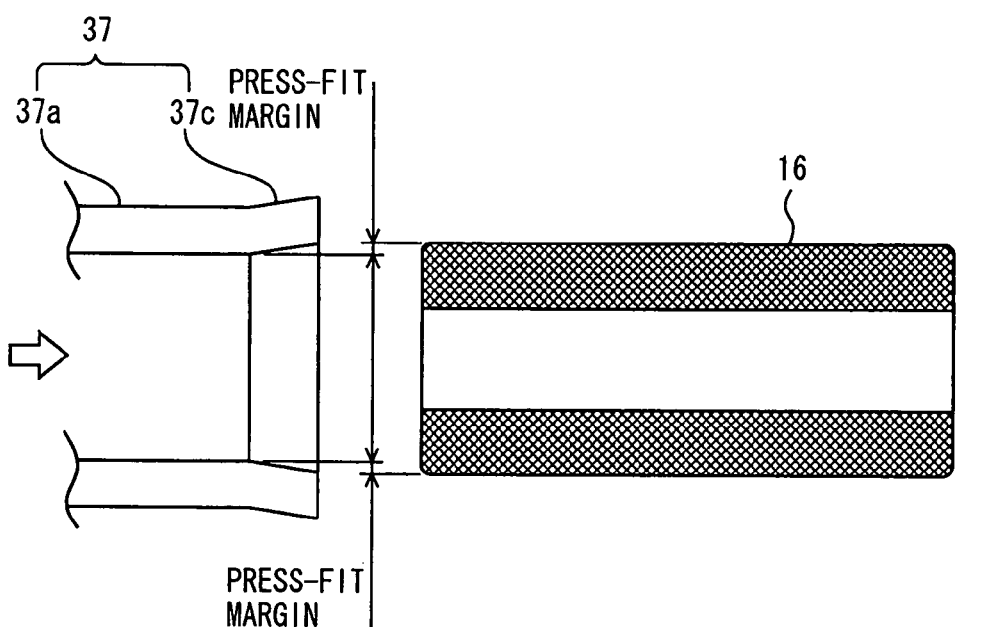
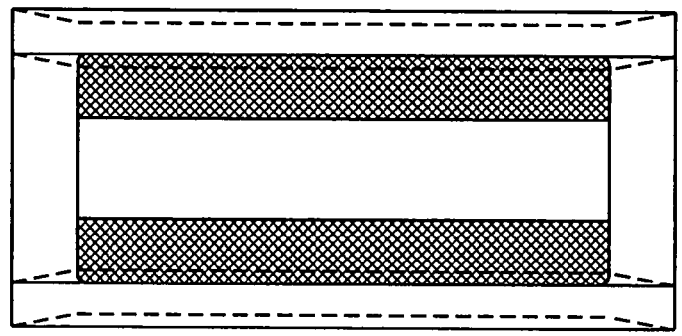

F I G. 1 5
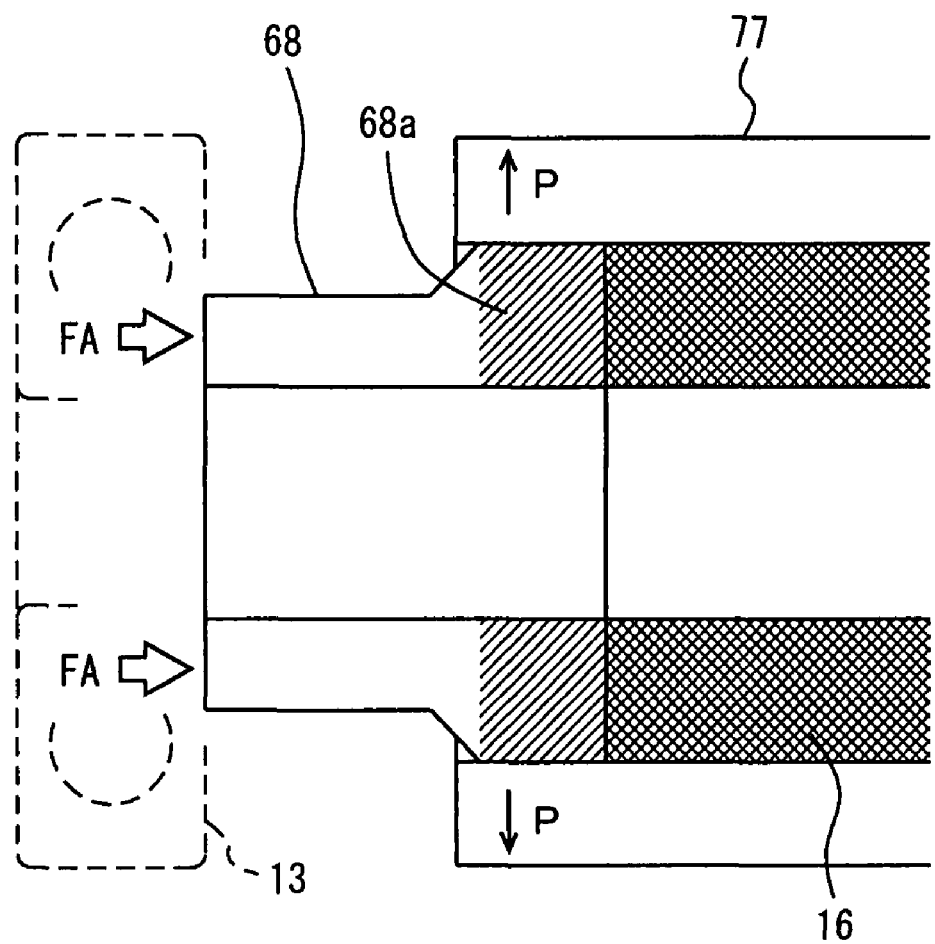

F I G. 1 8
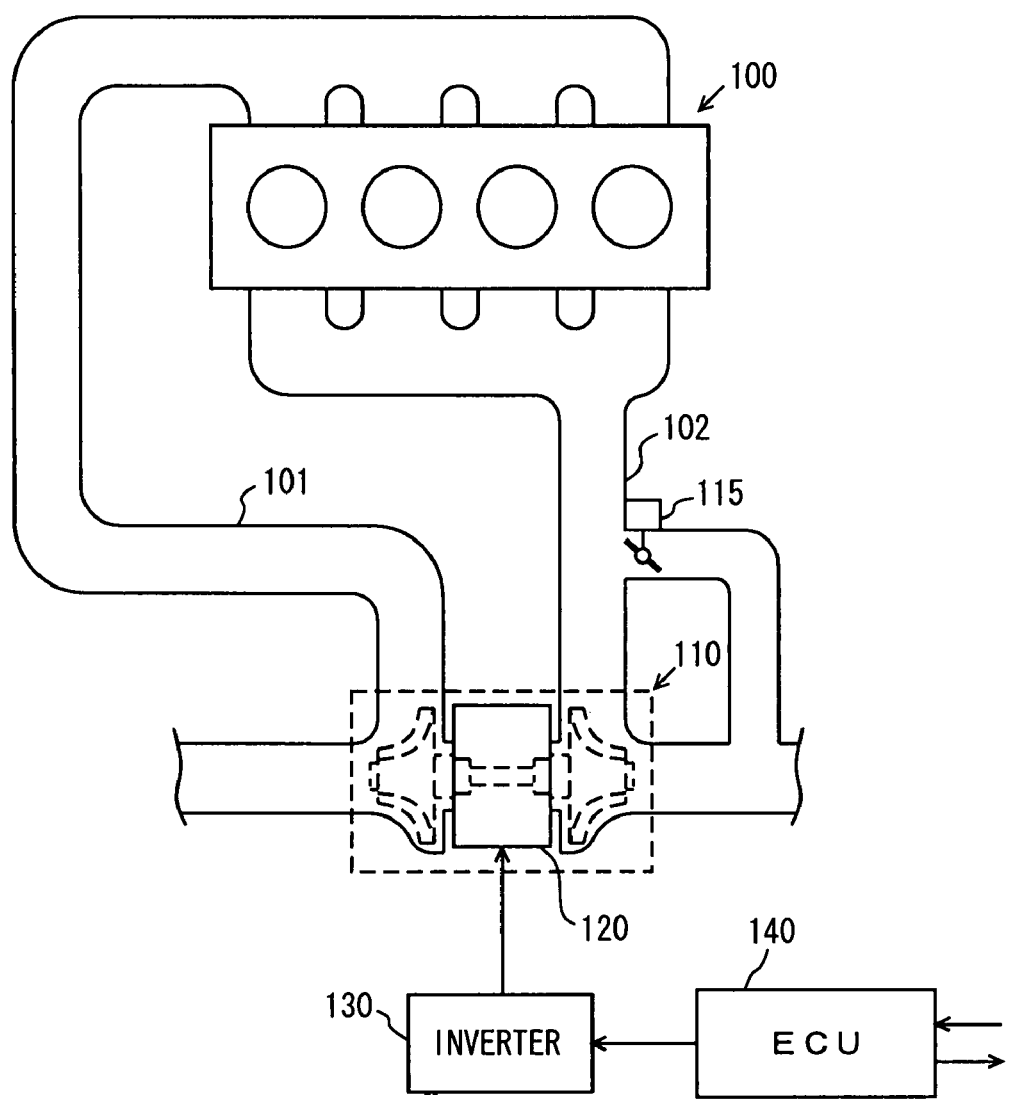

US 7,830,058 B2

SURFACE MAGNET TYPE MOTOR, FABRICATION METHOD OF SURFACE MAGNET TYPE MOTOR, AND INTERNAL COMBUSTION ENGINE WITH SURFACE MAGNET TYPE MOTOR

This is a 371 national phase application of PCT/JP2005/020787 filed 8 Nov. 2005, which claims priority of Japanese Patent Application No. 2004-330023 filed 15 Nov. 2004, the contents of which are incorporated herein by reference.

TECHNICAL FIELD

The present invention relates to a surface magnet type motor employing a magnet for the rotor, particularly to an anti-scattering tube for preventing scattering of the magnet.

BACKGROUND ART

Conventionally, there is known a surface magnet type motor including a rotor having a magnet arranged at the outer circumferential surface of the rotational shaft. This type of motor is provided with a non-magnetic anti-scattering tube at the circumference of the magnet to prevent fracture and scattering of the magnet caused by the centrifugal force when the rotor rotates at high speed.

The anti-scattering tube of the motor is generally fixed by press-fitting the magnet into the inner cylinder of the anti-scattering tube. Accordingly, the magnet is firmly maintained with force to prevent fracture and scattering of the magnet caused by centrifugal force (for example, refer to Japanese Patent Laying-Open Nos. 2001-025193 and 2001-218403).

In order to realize usage under a high centrifugal force in a wide range of operating temperature to accommodate higher speed rotation of a motor having such a structure, the press-fit margin between the anti-scattering tube and magnet must be increased to hold the magnet more firmly with stronger force. However, increase of the press-fit margin induces the possibility of the magnet being fractured during the press-fitting stage into the anti-scattering tube.

Even if the event of fracture does not occur at the time of assembly, such stress on the magnet may result in fracture during operation of the surface magnet type motor by the effect of the centrifugal force. Particularly in the case where such a motor is employed for the assist of the turbine shaft of a turbocharger that rotates as fast as one hundred and several ten thousands to two hundred and several ten thousands rpm, the strength as high as the operation limit of the turbine shaft must be ensured. Thus, the need arises for a structure and/or fabrication method that alleviates the stress on the magnet.

DISCLOSURE OF THE INVENTION

In view of the problems set forth above, an object of the present invention is to provide a surface magnet type motor with an anti-scattering tube that reduces stress on the magnet generated by press-fitting, a fabrication method, and an internal combustion engine including the surface magnet type motor.

A surface magnet type motor of the present invention is configured as set forth below in view of the aforementioned problem. A surface magnet type motor having a magnet at the surface of a rotor includes an anti-scattering tube formed in a cylindrical configuration longer in length than the magnet mounted at the rotor in an axial direction, having the magnet press-fitted therein for preventing scattering of the magnet, and a stress alleviation portion alleviating stress generated at an end of the magnet press-fitted into the anti-scattering tube.

The surface magnet type motor of the present invention includes, at the end of the anti-scattering tube that is longer in length than the magnet, a stress alleviation portion to alleviate stress generated at the end of the magnet caused by press-fitting the magnet into the anti-scattering tube. Specifically, a rotor can be provided in a reduced state of the stress imposed on the end of the magnet caused by press-fitting. Therefore, fracture of the magnet can be suppressed during press-fitting, during assembly of the rotor subsequent to press-fitting, or during usage as a motor.

The stress alleviation portion of the surface magnet type motor having the structure set forth above is provided at a projection portion that is a portion of the anti-scattering tube and protruding from each of both end faces of the press-fitted magnet, taking a configuration of suppressing a displacement difference in the direction of an inner diameter generated between the projection portion and a portion excluding the projection portion by the press-fitting.

According to the surface magnet type motor, the projection portion of the anti-scattering tube is provided with a configuration that suppresses the difference in the direction of the inner diameter. This is qualified as the stress alleviation portion. Specifically, the difference between the displacement in the direction of the inner diameter generated at a portion excluding the projection portion caused by press-fitting of the magnet and the displacement in the direction of the inner diameter of the projection portion that is affected by the press-fitting of the magnet into this portion is suppressed. Thus, significant deformation at a portion of the anti-scattering tube caused by press-fitting of the magnet can be suppressed. As a result, the stress imposed on the end of the magnet originating from the reactive force caused by deformation of the anti-scattering tube can be reduced.

The stress alleviation portion of the surface magnet type motor having the structure set forth above may take a configuration of suppressing the difference by forming the projection portion in lower rigidity than the portion excluding the projection portion.

According to the surface magnet type motor, the projection portion of the anti-scattering tube is provided with a configuration of low rigidity, which is qualified as the stress alleviation portion. Since the projection portion is of low rigidity, that portion is subject to the effect of press-fitting of the magnet to be readily deformed. In other words, the effect of the portion excluding the projection portion that is increased in diameter by the presence of a magnet inside is readily received. Therefore, the difference in displacement in the direction of the inner diameter between the projection portion and the portion excluding the projection subsequent to press-fitting of the magnet can be suppressed to reduce the stress imposed on the end of the magnet.

The configuration of suppressing the difference at the surface magnet type motor having the structure set forth above can achieve low rigidity by forming the projection portion thinner than the portion excluding the projection portion.

According to the surface magnet type motor, the projection portion is made thinner than the portion excluding the projection portion. For the thin configuration, the anti-scattering tube can be formed in, for example, a step-graded cylindrical configuration. Accordingly, the configuration of low rigidity can be realized by a relatively simply configuration to facilitate provision of a stress alleviation portion.

The configuration of suppressing the difference at the surface magnet type motor having the structure set forth above may achieve lower rigidity by forming a notch of a predetermined depth at the outer circumference of the projection portion.

According to the surface magnet type motor, a notch is formed at the outer circumference of the projection portion of the anti-scattering tube. Therefore, a configuration of low rigidity can be realized with a relatively simple process.

The stress alleviation portion of the surface magnet type motor having the structure set forth above may take a configuration of suppressing the difference by a tapered configuration having the inner diameter of the projection portion increased than the inner diameter of the portion excluding the projection portion.

According to the surface magnet type motor, the inner diameter of the projection portion is increased in a tapered manner. Specifically, there is formed in advance a configuration in which the inner diameter of the end portion of the projection portion is increased. Therefore, even if the inner diameter of the portion excluding the projection portion is increased by the press-fitting of the magnet, the difference in displacement in the direction of the inner diameter between the portions after press-fitting can be suppressed since the inner diameter of the projection portion is increased in advance. As a result, the stress imposed on the end of the magnet can be reduced.

The stress alleviation portion of the surface magnet type motor having the structure set forth above may take a configuration of suppressing the difference by forming the projection portion in a configuration having a diameter increased conically.

In accordance with the surface magnet type motor, the projection portion is formed to take a configuration in which both the inner diameter and outer diameter is increased conically towards the end. Therefore, the difference in the displacement in the direction of the inner diameter between the portions following press-fitting can be suppressed by virtue of the projection portion having the diameter increased in advance. Further, a configuration of suppressing the difference in the displacement in the direction of the inner diameter can be formed without greatly reducing the rigidity of the projection portion.

The surface magnet type motor having the structure set forth above includes an assembly flange between a bearing that is to be attached to the rotational shaft and each end plane of the magnet. The stress alleviation portion is provided at a contact portion where a projection portion that is a portion of the anti-scattering tube protruding from each end face of the press-fitted magnet is brought into contact with the assembly flange. There can be provided a configuration of suppressing the displacement difference in the direction of the inner diameter generated between the projection portion and a portion excluding the projection portion by press-fitting through application of external force in a direction of the rotational shaft from both outer sides of the assembly flange.

According to the surface magnet type motor, the contact portion is formed in a configuration of suppressing the difference in displacement in the direction of the inner diameter of the anti-scattering tube following press-fitting by the external force, which is qualified as the stress alleviation portion. In other words, by applying external force from both outer sides of the assembly flange to the anti-scattering tube where a displacement difference in the direction of the inner diameter is already generated by press-fitting of the magnet, the difference in displacement in the direction of the inner diameter is suppressed. Therefore, the stress imposed on the end of the magnet can be reduced.

The contact portion of the surface magnet type motor having the structure set forth above may take a configuration of converting the external force from the assembly flange into axial force imposed on the anti-scattering tube at the outer circumferential side than at the inner circumferential side.

According to the surface magnet type motor, the external force transmitted to the contact portion acts as the axial force imposed on the outer circumferential side of the anti-scattering tube. For example, when the inner diameter variation of the projection portion caused by press-fitting of the magnet is smaller than the inner diameter variation of the portion excluding the projection portion, the anti-scattering tube after press-fitting takes a configuration in which the projection portion is bent inward. By applying axial force to the outer circumferential side of the anti-scattering tube, force acts in a direction to improve the inward bending to suppress the difference in displacement in the direction of the inner diameter.

The surface magnet type motor according to the structure set forth above may have the contact portion of the anti-scattering tube take a salient configuration formed in contact with the assembly flange at the outer circumferential side end face of the anti-scattering tube.

According to the surface magnet type motor, a salient portion to transmit the external force to the outer circumferential side of the anti-scattering tube is formed at the contact portion of the anti-scattering tube, which is qualified as the stress alleviation portion. In other words, a salient configuration is provided at only the contact portion of the anti-scattering tube side. It is therefore not necessary to form the assembly flange side in a particular configuration.

In the surface magnet type motor having the structure set forth above, the contact portion of the assembly flange may be taken as a salient portion in contact with the outer circumference side end face of the anti-scattering tube.

According to the surface magnet type motor, the contact portion of the assembly flange is formed in a salient configuration that transmits the external force to the outer circumference side of the anti-scattering tube, which is qualified as the stress alleviation portion. In other words, a salient configuration is provided only at the contact portion of the assembly flange side. Therefore, it is not necessary to form the anti-scattering tube in a particular configuration.

In the surface magnet type motor having the structure set forth above, the contact portion of the anti-scattering tube is formed in a cylindrical configuration smaller than the outer diameter of the portion excluding the projection portion to set the anti-scattering tube entirely in a step-graded cylindrical configuration, and forming the contact portion of the assembly flange in a configuration brought into contact with the shoulder portion of the step-graded cylindrical configuration.

According to the surface magnet type motor, the small cylindrical portion of a step-graded cylindrical configuration is taken as the contact portion of the anti-scattering tube, and the configuration in contact with the shoulder portion is taken as the contact portion of the assembly flange. In addition to the advantage of reducing the rigidity, the axial force can be applied to the outer circumferential side of the anti-scattering tube via the shoulder to reduce the difference in the displacement in the direction of the inner diameter. As a result, the stress imposed on the end of the magnet can be reduced.

The contact portion of the surface magnet type motor having the structure set forth above may take a configuration of converting the external force from the assembly flange into the force acting in a direction to increase the inner diameter of the projection portion.

According to the surface magnet type motor, the external force transmitted to the contact portion acts as the force to increase the inner diameter of the projection portion of the anti-scattering tube. For example, when the inner diameter variation of the projection portion caused by the press-fitting of the magnet is smaller than the inner diameter variation of the portion excluding the projection portion, the anti-scattering tube subjected to press-fitting takes a configuration of the projection portion bent inwards. By applying external force to this anti-scattering tube, the inner diameter of the projection portion can be increased to suppress the difference in displacement in the direction of the inner diameter.

In the surface magnet type motor having the structure set forth above, the contact portion of the anti-scattering tube is formed in a tapered configuration having the inner diameter of the projection portion increased than the inner diameter of the portion excluding the projection portion, and the contact portion of the assembly flange is formed in a configuration engaging with the tapered configuration.

According to the surface magnet type motor, the contact portion of the anti-scattering tube is formed with the inner diameter increased in a tapered manner, and the contact portion of the assembly flange is formed in a configuration of engagement therewith to allow insert of the contact portion of the assembly flange into the anti-scattering tube. By the externally applied external force of the assembly flange having such a contact portion, the inner diameter of the anti-scattering tube at the end is increased by the function of the tapered configuration. Therefore, the difference in displacement in the direction of the inner diameter of the anti-scattering tube caused by press-fitting of the magnet can be suppressed.

In the surface magnet type motor having the structure set forth above, the contact portion of the assembly flange may be formed in a cylindrical configuration having an outer diameter substantially equal to the outer diameter of the magnet, capable of being press-fitted into the projection portion of the anti-scattering tube.

According to the surface magnet type motor, the projection portion of the anti-scattering tube is press-fitted into the assembly flange. Therefore, the inner diameter of the projection portion is increased substantially similar to the inner diameter of the portion excluding the projection portion. The difference in displacement in the direction of the inner diameter can be suppressed over the entire length of the anti-scattering tube.

A fabrication method for a surface magnet type motor of the present invention is directed to a fabrication method of a surface magnet type motor having a magnet at the surface of a rotor, and includes: step (a) of forming an anti-scattering tube, covering the surface of the magnet of the rotor to prevent scattering of the magnet, in a cylindrical configuration longer in length than the magnet in the axial direction; and step (b) of press-fitting the magnet into the anti-scattering tube while constituting a stress alleviation portion that alleviates stress generated at an end of the magnet stored in the anti-scattering tube.

According to the fabrication method, the magnet is press-fitted into the anti-scattering tube while constituting a stress alleviation portion that alleviates the stress generated at an end of the magnet. The stress alleviation portion is constituted prior to press-fitting of the magnet, or in a following manner after press-fitting of the magnet. Thus, a fabrication method is provided that alleviates stress generated at the magnet to suppress fracture thereof.

In the fabrication method of a surface magnet type motor based on the steps set forth above, step (b) may include step (b1) of press-fitting the magnet into the anti-scattering tube to form a projection portion protruding from each of both end faces of the magnet, step (b2) of attaching an assembly flange to the projection portion to clamp the anti-scattering tube by the assembly flange, and step (b3) of, after step (b2), attaching a rotational shaft and bearing to the anti-scattering tube while applying axial force to the anti-scattering tube in a direction of the rotational shaft via the bearing to mount the rotor in a housing of the surface magnet type motor.

According to the fabrication method, axial force is applied to the anti-scattering tube in the direction of the rotational shaft via the bearing when the rotor is mounted in the housing. Therefore, the bending of the anti-scattering tube in the direction of the inner diameter, if caused, can be alleviated.

In the fabrication method of a surface magnet type motor based on the steps set forth above, step (b) may include step (b11) of press-fitting the magnet into the anti-scattering tube to form a projection portion protruding from each of both end faces of the magnet, step (b12) of attaching the assembly flange to the projection portion for fixture while applying axial force to the anti-scattering tube in the direction of the rotational shaft, and step (b13) of, after step (b12), attaching a rotational shaft and bearing to the anti-scattering tube to which axial force is applied to mount the rotor in a housing of the surface magnet type motor.

According to the fabrication method, axial force is applied to the anti-scattering tube in the direction of the rotational shaft when the assembly flange is attached to the anti-scattering tube into which the magnet is press-fitted. Therefore, improvement is established in advance in view of bending of the anti-scattering tube in the direction of the inner diameter.

In the fabrication method of a surface magnet type motor based on the steps set forth above, step (b) may include step (b21) of clamping the magnet by the assembly flange from both sides, step (b22) of press-fitting the magnet and the assembly flange integrally into the anti-scattering tube, and step (b23) of, after step (b22), attaching a rotational shaft and bearing to the anti-scattering tube to mount the rotor in a housing of the surface magnet type motor.

According to the fabrication method, the magnet and two assembly flanges are press-fitted integrally into the anti-scattering tube. Therefore, the rotor can be assembled efficiently with fewer steps as compared to the case where the assembly flange is press-fitted from both ends of the anti-scattering tube subjected to press-fitting of the magnet.

In the fabrication method of a surface magnet type motor based on the steps set forth above, step (b) may include step (b31) of clamping the magnet by the assembly flange from both sides in a state of axial force applied to the magnet in a direction of the rotational shaft, step (b32) of press-fitting the magnet in a state under application of axial force and the assembly flange integrally into the anti-scattering tube, and step (b33) of attaching a rotational shaft and bearing to the anti-scattering tube with the magnet and assembly flange to mount the rotor in a housing of the surface magnet type motor.

According to the fabrication method, axial force is applied to the magnet per se in the direction of the rotational shaft, i.e. compressive force is applied for mounting the rotor in the housing under this state. In addition to the advantage of the third fabrication method, deformation of constriction or elongation of the magnet during the press-fitting process can be regulated, i.e. tensile stress can be suppressed, to reduce fracture of the magnet.

In the fabrication method of a surface magnet type motor based on the steps set forth above, step (b31) may include the step of passing an assembly bolt through the magnet and the assembly flange to apply axial force by tightening an assembly nut.

In accordance with the fabrication method, axial force can be readily applied to the magnet per se by the tightening force of the assembly bolt and assembly nut.

An internal combustion engine including a surface magnet type motor of the present invention is directed to an internal combustion engine including a supercharger with a turbine shaft. The surface magnet type motor having a magnet at the surface of a rotor is employed as a motor for assist of the turbine shaft. The surface magnet type motor includes an anti-scattering tube formed in a cylindrical configuration longer in length than the magnet mounted at the rotor in an axial direction, having the magnet press-fitted therein for preventing scattering of the magnet. The surface magnet type motor is provided with a stress alleviation portion for alleviating stress generated at an end of the magnet press-fitted into the anti-scattering tube. The surface magnet type motor is provided coaxially with the turbine shaft.

According to the internal combustion engine of the present invention, the surface magnet type motor for alleviating stress generated at the end of the magnet is arranged coaxially with the turbine shaft for assist of the turbine shaft. Since the surface magnet type motor is under a state in which the stress on the magnet is alleviated, the surface magnet type motor is sufficiently durable even if great centrifugal force is applied by the rotation together with the turbine shaft that rotates at high speed. There can be provided an internal combustion engine with a supercharger including a motor for assist that can be arranged coaxially with a turbine shaft that rotates at high speed.

BRIEF DESCRIPTION OF THE DRAWINGS

FIG. 3 is a schematic diagram representing the difference in inner diameter after press-fitting between the different structure of a conventional case and the first embodiment.

FIG. 6 is a schematic diagram representing a manner of a magnet press-fitted into the anti-scattering tube of the second embodiment.

FIG. 15 is a partial sectional view of a structure of a modification of the contact portion.

FIG. 18 is a schematic diagram of a system including a surface magnet type motor as an engine with a turbocharger.

BEST MODES FOR CARRYING OUT THE INVENTION

The present invention will be described based on embodiments in the order set forth below.

Figure 1:
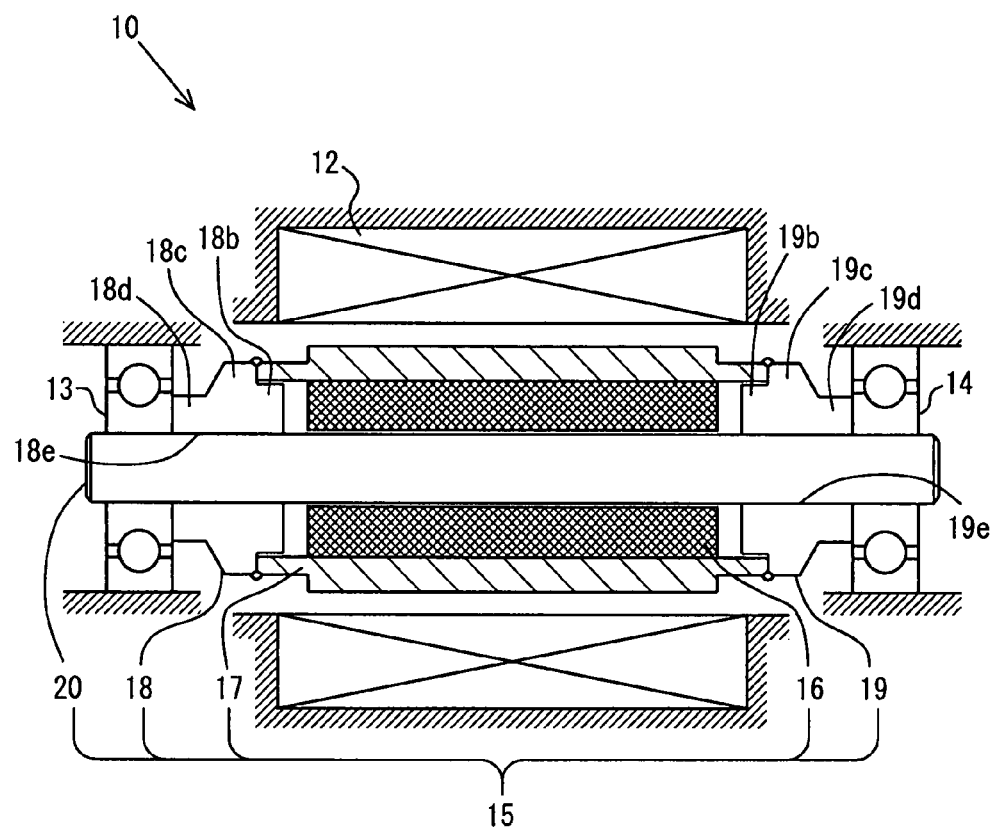
FIG. 1 is a schematic diagram of a cross section of a first surface magnet type motor of the present invention.

A. Structure of First Motor:
A-1. First embodiment of anti-scattering tube:
A-2. Second embodiment of anti-scattering tube:
B. Structure of Second Motor:
B-1. First embodiment of contact portion structure
B-2. Second embodiment of contact portion structure
B-3. Third embodiment of contact portion structure
C. Modification:
A. Structure of First Motor:

FIG. 1 is a schematic diagram of a cross section of a first surface magnet type motor of the present invention. As shown in the drawing, a first surface magnet type motor 10 (hereinafter, simply referred to as motor 10) is mainly formed of a rotor 15 qualified as the rotary part of motor 10, a stator 12 qualified as the stationary part of motor 10, and bearings 13 and 14 for the fixture of rotor 15 in the housing of motor 10. This motor 10 includes a magnet 16 for rotor 15. Stator 15 includes a coil for generating electromagnetic force. Rotational torque is generated by magnet 16 that repels against the electromagnetic force. This motor 10 is coupled with the turbine shaft of a vehicle on which a turbocharger is mounted to assist the turbine shaft (refer to FIG. 18). The rotational speed of rotor 15 becomes as high as several hundred thousands rpm.

Rotor 15 includes, in addition to magnet 16, a rotational shaft 20 qualified as the output shaft, an anti-scattering tube 17 preventing fracture and/or scattering of magnet 16, and assembly flanges 18 and 19 between anti-scattering tube 17 and respective bearings 13 and 14.

Rotational shaft 20 rotates at high speed together with magnet 16, anti-scattering tube 17 and assembly flanges 18 and 19. Magnet 16 is formed of a sintered magnet of a cylindrical configuration, receiving significant centrifugal force by the high-speed rotation. Anti-scattering tube 17 takes a partially cylindrical configuration, arranged at the circumference of magnet 16 to prevent fracture of magnet 16 caused by the centrifugal force effect.

Assembly flanges 18 and 19 include cylindrical portions 18b and 19b fitting with play into the inner circumference of anti-scattering tube 17, partially cylindrical portions 18c and 19c abutting against the end face of anti-scattering tube 17 to serve as a junction with anti-scattering tube 17, and cylindrical portions 18d and 19d abutting against the inner ring of bearings 13 and 14, with inner cylindrical portions 18e and 19e having an inner diameter smaller than the inner diameter of magnet 16. Rotational shaft 20 is held by this inner cylindrical portion. Since anti-scattering tube 17 is disposed between magnet 16 and stator 12, i.e. within the rotation magnetic field, anti-scattering tube 17 is formed of a non-magnetic material that avoids effect therefrom, for example, of titanium or stainless steel.

Rotor 15 of the structure set forth above is assembled by press-fitting magnet 16 into anti-scattering tube 17 for fixture, attaching assembly flanges 18 and 19 from both ends of anti-scattering tube 17 for fixture, and passing rotational shaft 20 therethrough. Fixture of magnet 16 and anti-scattering tube 17 is effected by press-fitting with a large press-fitting margin. Accordingly, the effect of centrifugal force imposed on magnet 16 due to high speed rotation is reduced. Fixture of anti-scattering tube 17 and assembly flanges 18 and 19 is effected by welding the junction with alignment using a jig.

Rotational shaft 20 of the assembled rotor 15 has bearings 13 and 14 attached. For bearings 13 and 14, a ball bearing having low rotation resistance is employed to take a structure that can withstand even high speed rotation. By mounting rotor 15 with bearings 13 and 14 attached in a housing of motor 10 including stator 12, electric motor 10 is implemented. The current flow to the coil of stator 12 is supplied from an electric circuit (refer to FIG. 18).

Figure 2:
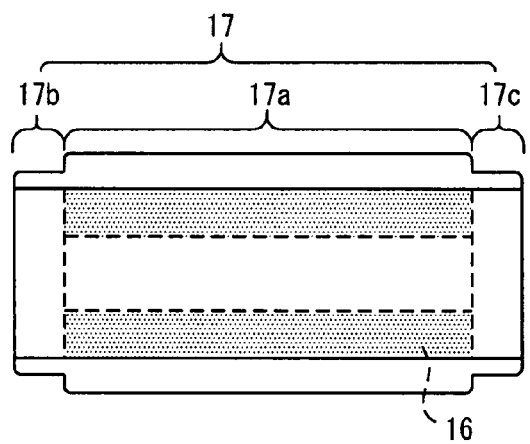
FIG. 2 is a sectional view of a structure of an anti-scattering tube of a first embodiment.

A-1. First Embodiment of Anti-Scattering Tube:

FIG. 2 is a sectional view of a structure of anti-scattering tube 17 of the first embodiment into which magnet 16 is press-fitted. As shown in the drawing, anti-scattering tube 17 made of titanium is formed in a step-graded cylindrical configuration longer in length than magnet 16. Magnet 16 is located in the proximity of approximately the center of the step-graded cylindrical configuration. This anti-scattering tube 17 is mainly formed of three portions, i.e. a cylinder portion 17a in which magnet 16 is present (arranged), and projection portions 17b and 17c at respective ends, protruding from respective end faces of magnet 16. Provision of projection portions 17b and 17c prevents any piece of magnet 16, when fractured, from being scattered outside.

The inner diameter of cylinder portion 17a and projection portions 17b and 17c are the same, and made smaller than the outer diameter of magnet 16. By press-fitting with a predetermined tightening margin (press-fit margin) applied, magnet 16 and anti-scattering tube 17 are fixed without relative sliding therebetween even during high speed rotation. Projection portions 17b and 17c take a cylindrical configuration thinner than cylinder portion 17a, and have rigidity lower than that of cylinder portion 17a. In other words, projection portions 17b and 17c are more readily deformed (elastic deformation) as compared to cylinder portion 17a. In the present embodiment, the outer circumference of anti-scattering tube 17 is φ 30 (30 mm) with a tightening margin of 0.1 mm for the press-fitting margin. A press-fitting force of several tons is applied to establish the fixture between magnet 16 and anti-scattering tube 17.

By such press-fitting of magnet 16 into anti-scattering tube 17, anti-scattering tube 17 receives reactive force from magnet 16 to be deformed (increased in diameter) within the elastic range. Cylinder portion 17a of anti-scattering tube 17 is under a state in which the diameter remains increased due to the presence of magnet 16 inside. Projection portions 17b and 17c are deformed, although magnet 16 is not present at the inner side, due to the low rigidity. In other words, projection portions 17b and 17c are also increased in inner diameter, so that the difference in the inner diameter between cylinder portion 17a and projection portions 17b and 17c subjected to press-fitting can be reduced.

FIG. 3 is a schematic diagram representing the difference in inner diameter after press-fitting between the different structure of a conventional case and the first embodiment. FIG. 3 (a) corresponds to a conventional structure whereas FIG. 3 (b) corresponds to the structure of the first embodiment. The broken line in the drawing represents the configuration prior to press-fitting of magnet 16. As shown in FIG. 3 (a), projection portions A2 and A3 of anti-scattering tube A of the conventional structure, protruding from the end face of magnet 16 that is press-fitted, take a cylindrical configuration similar to that of cylinder portion A1 where press-fitted magnet 16 is present, and are relatively rigid. Therefore, projection portions A2 and A3 are not readily deformed, resulting an inner diameter difference D after magnet 16 is press-fitted. By this inner diameter difference, a bending moment M0 is generated at the end of magnet 16.

In contrast, as shown in FIG. 3 (b) corresponding to anti-scattering tube 17 of the first embodiment, projection portions 17b and 17c have an inner diameter variation greater than that of the conventional structure, resulting in an inner diameter difference d (d<D). Therefore, excessive bending stress (bending moment M0) will not be generated at the end of magnet 16 by the reactive force from projection portions 17b and 17c, seldom leading to fracture. In other words, the bending stress generated at the end of magnet 16 by press-fitting can be alleviated by virtue of the deformation of projection portions 17b and 17c of anti-scattering tube 17. As a result, fracture of magnet 16 can be suppressed during press-fitting, during attachment as rotor 15 subsequent to press-fitting, or during usage as motor 10. Further, by virtue of anti-scattering tube 17 taking a step-graded cylindrical configuration, the rigidity of projection portions 17b and 17c can be reduced. Therefore, a configuration of alleviating stress on magnet 16 can be realized by a relatively simple configuration.

The configuration of an anti-scattering tube providing such advantages is not limited to a step-graded cylindrical configuration. The outer cylinder can be worked into a tapered configuration, for example, to obtain smooth transition in cross section. Although the length of the tapered portion is not particularly limited in the work of tapering, it is desirable to set the length corresponding to the length of the projection portion in view of the purpose of reducing the rigidity, as compared to a simple chamfered tapered configuration. By removing a portion from the outer surface of the cylinder of the projection portion (or removing the inner surface of the cylinder) to achieve low rigidity, various configurations can be envisaged to suppress fracture of magnet 16.

Figure 4:
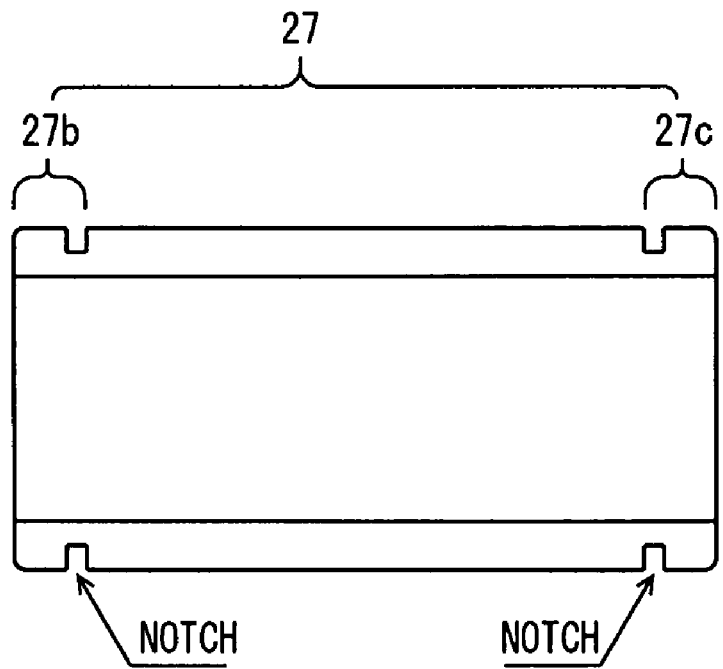
FIG. 4 is a sectional view of an example of an anti-scattering tube.

FIG. 4 shows an example of an anti-scattering tube including a projection portion of low rigidity. As shown in the drawing, an anti-scattering tube 27 has a cylindrical configuration substantially similar to that of anti-scattering tube 17 of FIG. 2, and differs only in the configuration of projection portions 27b and 27c protruding from the end face of press-fitted magnet 16. Projections 27b and 27c of anti-scattering tube 27 has a groove corresponding to a notch of a predetermined width and predetermined depth over the entire perimeter. By providing such notches, similar advantages can be provided even with projection portions 27b and 27c of low rigidity. Furthermore, projection portions 27b and 27c of low rigidity can be formed by a relatively simple process.

Figure 5:
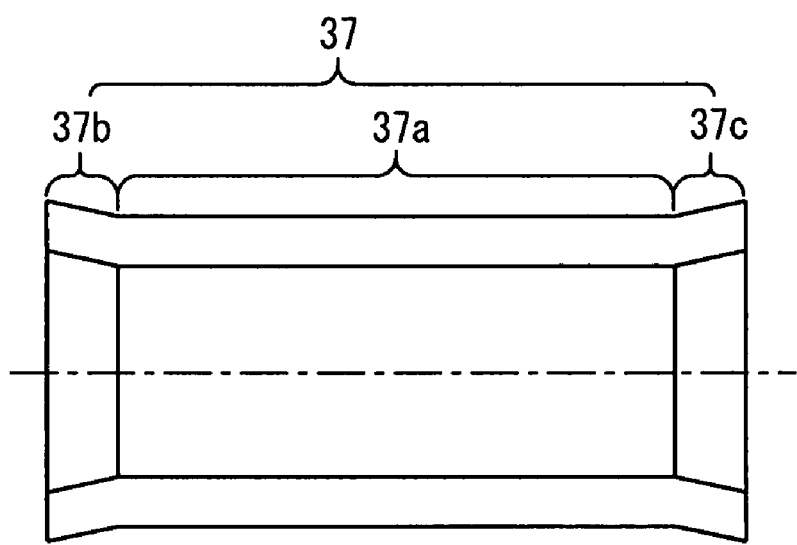
FIG. 5 is a sectional view of a structure of an anti-scattering tube according to a second embodiment.

A-2. Second Embodiment of Anti-Scattering Tube:

The first embodiment is directed to suppressing the inner diameter difference by forming projection portions 17b and 17c in a configuration of low rigidity. However, projection portions 17b and 17c do not necessarily have to be of low rigidity. FIG. 5 is a sectional view of a structure of an anti-scattering tube according to a second embodiment into which magnet 16 is press-fitted. As indicated in the drawing, this anti-scattering tube 37 is formed of the three portions, i.e. a cylinder portion 37a, similar to that in the first embodiment, and projection portions 37b and 37c protruding from the end face of press-fitted magnet 16.

Projection portions 37b and 37c are formed in a conical configuration with both the inner diameter and outer diameter gradually increased from the side of cylinder portion 37a towards the end of anti-scattering tube 37. Therefore, projection portions 37b and 37c have high rigidity as compared to cylinder portion 37a, differing from the manner in the first embodiment.

FIG. 6 is a schematic diagram representing a manner of magnet 16 press-fitted into anti-scattering tube 37 of the second embodiment. As indicated in the drawing, by press-fitting magnet 16 into anti-scattering tube 37 of a configuration indicated by the broken line with a predetermined press-fit margin, cylinder portion 37*a* exhibits a significant inner diameter variation due to the presence of magnet 16 inside, likewise the first embodiment. The inner diameter variation of projection portions 37*b* and 37*c* becomes smaller since the effect of cylinder portion 37*a* is smaller by virtue of its high rigidity. In other words, by increasing the inner diameter of projection portions 37*b* and 37*c* in advance, the difference in the inner diameter of cylinder portion 37*a* subsequent to press-fitting can be reduced. FIG. 6 represents that the inner diameter of cylinder portion 37*a* subjected to press-fitting becomes substantially equal to the inner diameter of projection portions 37*b* and 37*c* subjected to press-fitting.

By setting the inner diameter configuration of projection portions 37*b* and 37*c* of anti-scattering tube 37 in expectation of variation in the inner diameter of anti-scattering tube 37 after press-fitting, the difference in inner diameter can be suppressed by the entirety of anti-scattering tube 37. As a result, excessive bending stress will not be generated on the end of magnet 16, seldom leading to fracture. Furthermore, the rigidity of projection portions 37*b* and 37*c* is not reduced.

Figure 7:
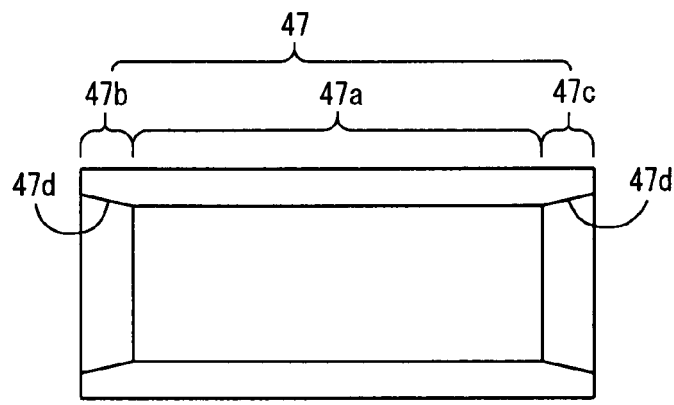
FIG. 7 is a sectional view of an example of an anti-scattering tube.

The projection portion may take the contour configuration shown in FIG. 7, for example, corresponding to a structure in which the inner diameter is increased in advance. An anti-scattering tube 47 shown in the drawing is formed of a three portions, likewise the first embodiment, all taking a cylindrical configuration having the same outer diameter. Cylinder portion 47*a* among these three portions has an inner diameter identical to that of the first embodiment. It is to be noted that the inner diameter of projection portions 47*b* and 47*c* protruding from the end face of press-fitted magnet 16 is set to correspond to a tapered configuration 47*d* gradually increased in diameter from the side of cylinder portion 47*a* towards the outer side. By press-fitting magnet 16 into such an anti-scattering tube 47, advantages similar to those of the second embodiment can be provided. Projection portions 47*b* and 47*c* have a tapered configuration 47*d* along the entire length thereof, differing from the tapered configuration provided for positioning in a press-fitting mode.

Figure 8:
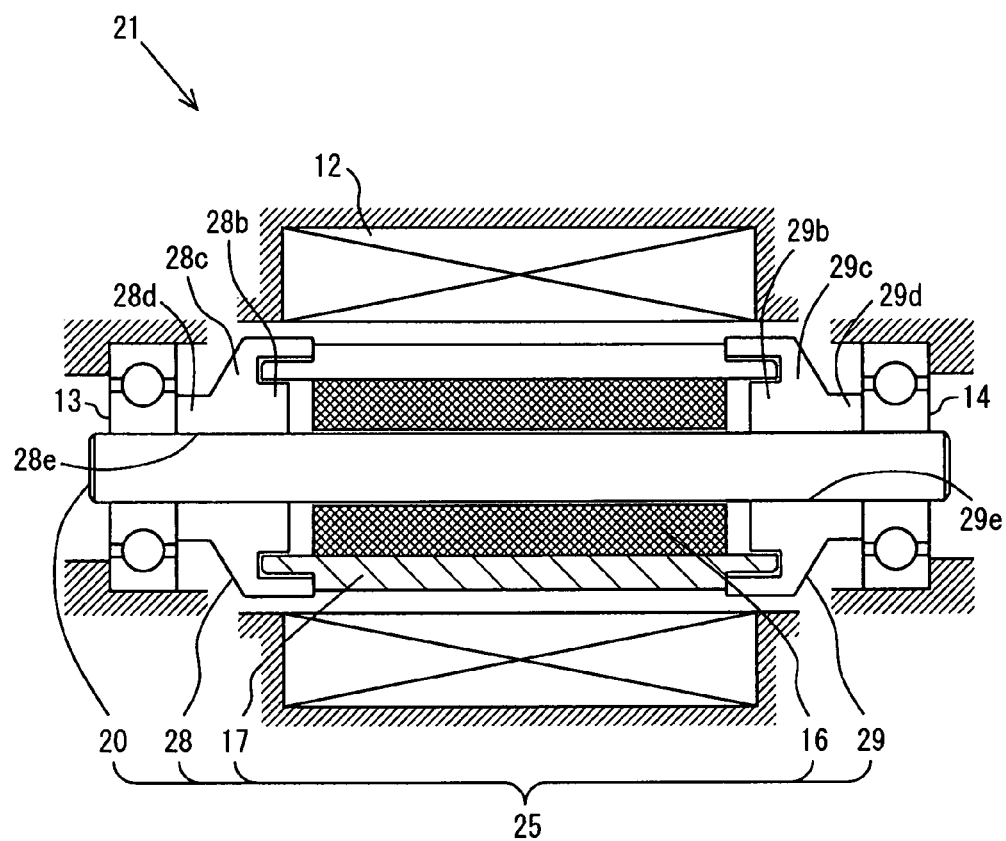
FIG. 8 is a schematic diagram of a second surface magnet type motor of the present invention.

B. Structure of Second Motor:

FIG. 8 is a schematic diagram of a second surface magnet type motor of the present invention. As shown in the drawing, a second surface magnet type motor 21 (hereinafter, simply referred to as motor 21) has a structure basically similar to that of first surface magnet type motor 10 shown in FIG. 1, provided that a rotor 25 differs. Therefore, the remaining elements have reference characters identical to those of FIG. 1 allotted, and description thereof will not be repeated.

As shown in FIG. 8, a rotor 25 is mainly formed of a rotational shaft 20 similar to that of first motor 10, a magnet 16, an anti-scattering tube 17, and assembly flanges 28 and 29.

Assembly flanges 28 and 29 include, likewise assembly flanges 18 and 19 of first motor 10, cylindrical portions 28*b* and 29*b* fitting inside anti-scattering tube 17, cylindrical portions 28*d* and 29*d* abutting against the inner ring of bearings 13 and 14, and contact portions 28*c* and 29*c* of a particular configuration in contact with anti-scattering tube 17. Inside assembly flanges 28 and 29 are provided inner cylindrical portions 28*e* and 29*e* having an inner diameter larger than that of assembly flanges 18 and 19 of the first embodiment. In other words, assembly flanges 28 and 29 form contact with rotational shaft 20 in a slidable manner in the axial direction. Alignment of assembly flanges 28 and 29 with anti-scattering tube 17 is effected by cylindrical portions 28*b* and 29*b*. Portions 28*c* and 29*c* of a particular configuration for assembly flanges 28 and 29 will be described afterwards as the contact portion structure of assembly flanges 28 and 29.

Figure 9:
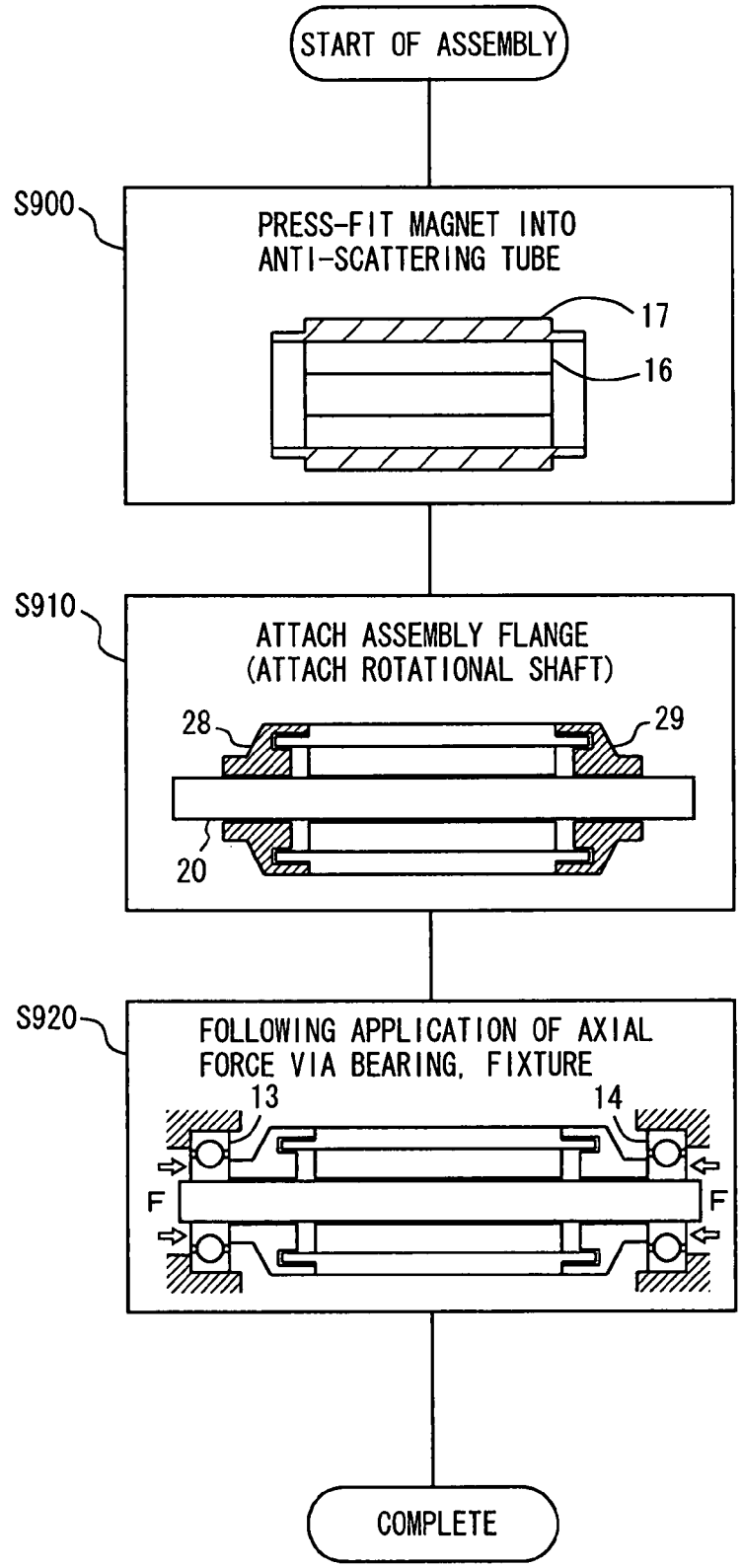
FIG. 9 is a process chart of assembly steps of a rotor corresponding to a fabrication method of a motor.

Rotor 25 including the components set forth above is assembled by the procedure shown in FIG. 9. FIG. 9 is a process chart of assembly steps of rotor 25 corresponding to a fabrication method of motor 21. As shown in the drawing, magnet 16 is press-fitted into anti-scattering tube 17 (step S900). Then, anti-scattering tube 17 with magnet 16 is clamped at both ends by assembly flanges 28 and 29, and rotational shaft 20 is attached (step S910).

Under this state, bearings 13 and 14 are fitted to rotational shaft 20. Axial force F is applied to assembly flanges 28 and 29 in the direction of rotational shaft 20 via bearings 13 and 14. The intact motor 21 with stator 12 is fixed in a housing (step S920) to complete assembly of rotor 25. Following the assembly of rotor 25, predetermined steps are carried out to complete motor 21. Since assembly flanges 28 and 29 of rotor 25 assembled in accordance with these procedures are in contact with the inner ring of bearings 13 and 14, magnet 16, anti-scattering tube 17, assembly flanges 28 and 29, and rotational shaft 20 rotate integrally. The inner ring of bearings 13 and 14 and assembly flanges 28 and 29 are fixed by a whirl-stop not shown.

Figure 10:
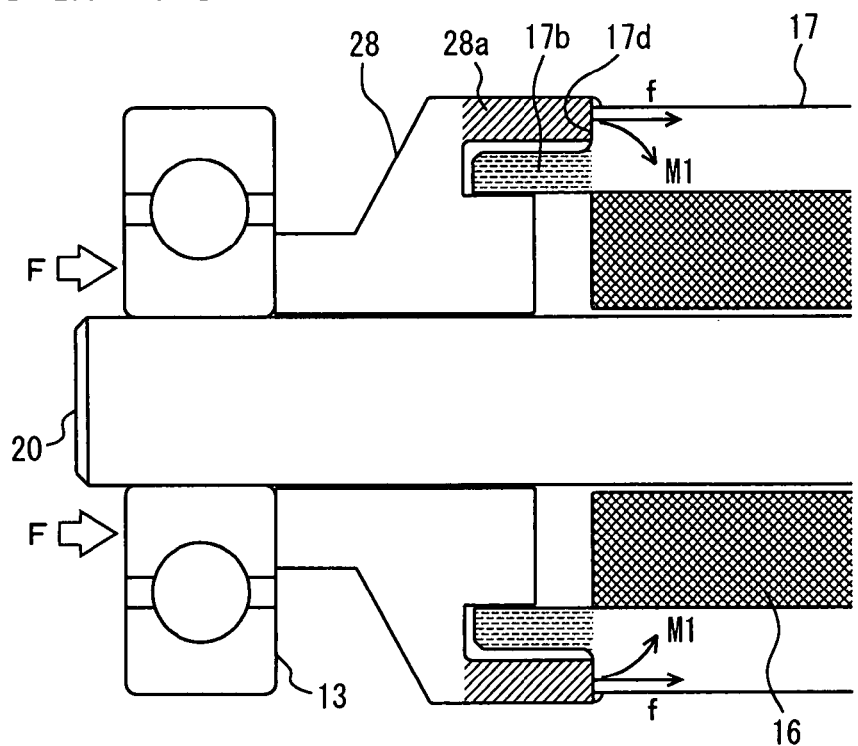
FIG. 10 is a partial sectional view of a structure of a contact portion of the first embodiment.

B-1. First Embodiment of Contact Portion Structure:

Contact portions 28*c* and 29*c* of a particular configuration are provided at assembly flanges 28 and 29 and anti-scattering tube 17 shown in FIG. 8. FIG. 10 is a sectional view representing a portion of this contact portion in an enlarged manner. As shown in the drawing, assembly flange 28 includes a salient 28*a* having an outer diameter substantially equal to that of anti-scattering tube 17. Anti-scattering tube 17 includes a shoulder 17*d* at the stepped portion of the cylindrical perimeter as a result of forming projection portion 17*b* in a step-graded cylindrical configuration. The contact portion of the first embodiment is configured such that salient 28*a* is in contact with shoulder 17*d*, and assembly flange 28 is not directly in contact with the end face of projection portion 17*b*. Although not shown, a contact portion is also provided at the bearing 14 side, symmetrical to the portion at the bearing 13 side shown in FIG. 10.

Assembly flange 28 and anti-scattering tube 17 (including magnet 16) corresponding to the contact portion structure set forth above has an externally applied axial force F (compression force) during the assembly stage. The applied axial force F is transmitted as axial force F in the proximity of the outer circumference of anti-scattering tube 17 via salient 28*a* of assembly flange 28 (refer to the arrow in FIG. 10). Axial force F imposed in the proximity of the outer circumference of anti-scattering tube 17 acts as moment M1 that spreads the inner cylindrical portion of anti-scattering tube 17. This moment M1 works in a direction to reduce bending moment M0 generated at projection portions 17*b* and 17*c* of anti-scattering tube 17 caused by press-fitting of magnet 16. In other words, as shown in FIG. 3 (*a*), a force acts in a direction to improve the bending of anti-scattering tube A corresponding to projection portions A2 and A3 bending inwards by press-fitting. Therefore, in addition to the advantage by the configuration of projection portions 17*b* and 17*c* described in the first embodiment with reference to FIG. 3 (*b*), the difference in the inner diameter displacement of anti-scattering tube 17 can be further reduced to alleviate the bending stress on magnet 16. Although the present embodiment is described based on a structure in which approximately half the thickness (outer circumference side) of anti-scattering tube 17 forms contact, similar advantages can be provided as long as the contact is located closer to the outer circumference (outer perimeter side) than the inner circumference of anti-scattering tube 17. Such a contact portion may take any structure as long as the applied axial force F acts in a direction to reduce bending moment M0 (refer to FIG. 3) generated at the anti-scattering tube. Other structures of such a contact portion is shown hereinafter.

Figure 11:
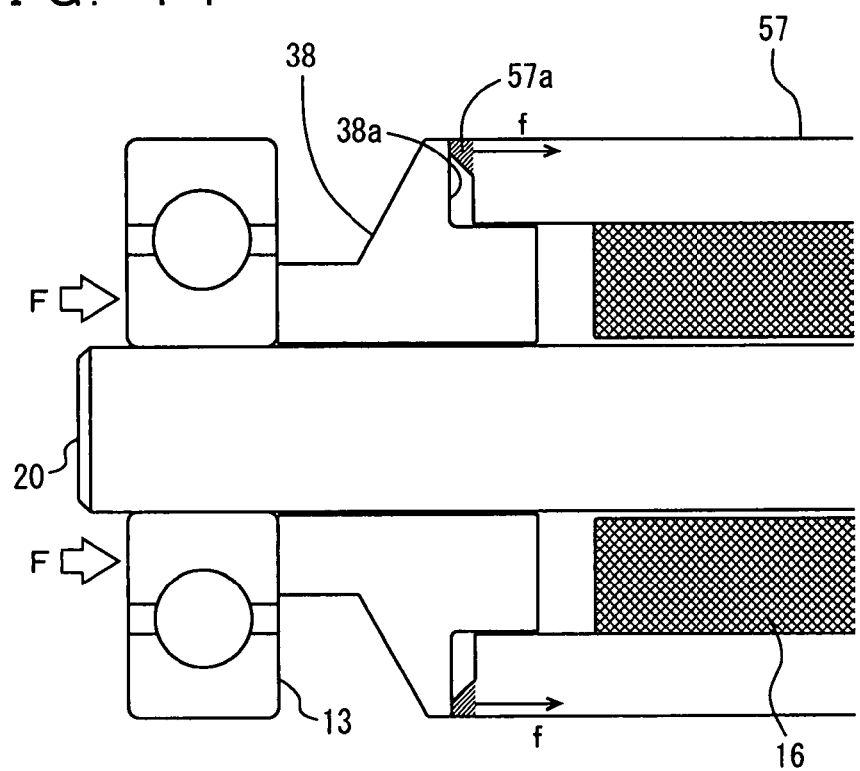
FIG. 11 is a partial sectional view of a structure of a contact portion of the second embodiment.

B-2. Second Embodiment of Contact Portion Structure:

FIG. 11 is a partial sectional view of a structure of a contact portion of the assembly flange and anti-scattering tube according to the second embodiment. Although only the bearing 13 side is indicated as the contact portion structure in FIG. 11, a contact portion structure symmetric to the bearing 13 side is provided at the bearing 14 side, likewise FIG. 10.

As shown in the drawing, the contact portion of anti-scattering tube 57 includes a salient 57a protruding in the axial direction in the proximity of the outer circumference at both ends of the cylindrical configuration. The contact portion of assembly flange 38 includes a flat face 38a. Externally applied axial force F acts as axial force f (refer to the arrow in FIG. 11) on salient 57a of anti-scattering tube 57 via the inner ring of bearing 13 and flat face 38a of assembly flange 38. Therefore, likewise first embodiment, bending moment M0 generated at anti-scattering tube 57 is reduced to suppress the inner diameter displacement difference by axial force f applied in the proximity of the outer circumference of anti-scattering tube 57. Therefore, the bending stress on magnet 16 can be alleviated.

Figure 12:
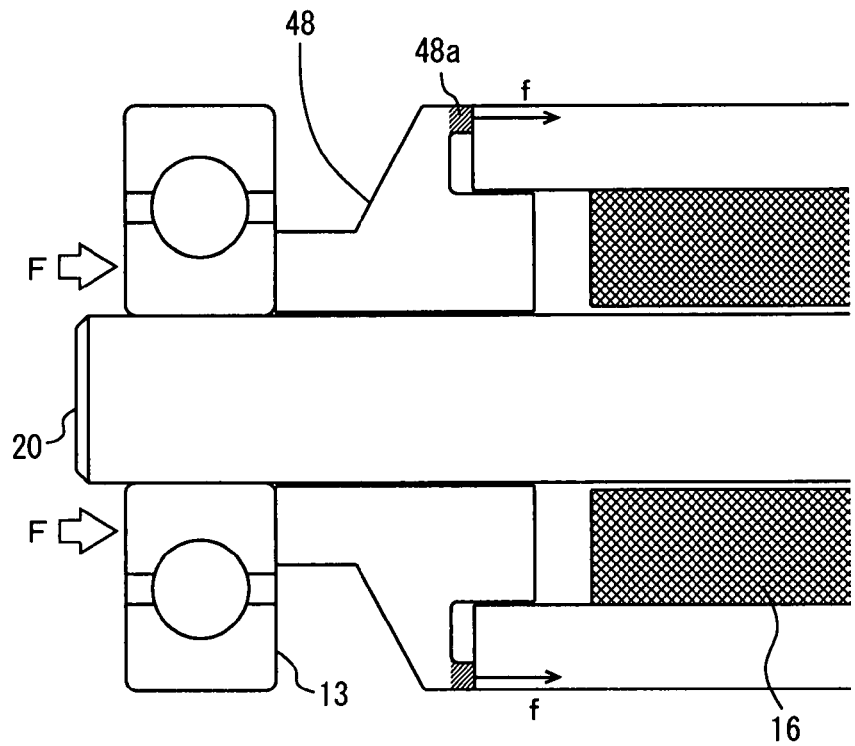
FIG. 12 is a sectional view of an example of a structure of a contact portion.

Salient 57a provided only on the part of anti-scattering tube 57 may be provided only on the part of assembly flange 48, as shown in FIG. 12. In this case, a salient 48a is provided at assembly flange 48, as shown in the drawing. It is not necessary to provide a particular configuration for the anti-scattering tube, as compared to the structure shown in FIG. 10.

Figure 13:
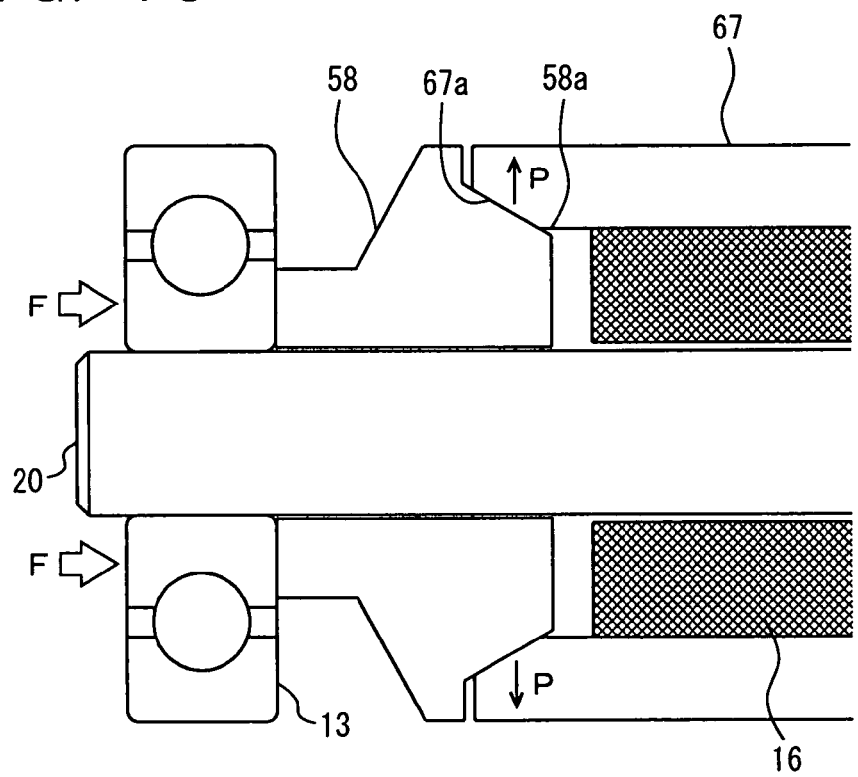
FIG. 13 is a partial sectional view of a structure of a contact portion of a third embodiment.

B-3. Third Embodiment of Contact Portion Structure:

FIG. 13 is a partial sectional view of a structure of a contact portion of the assembly flange and anti-scattering tube according to a third embodiment. Although only the bearing 13 side is indicated as the contact portion structure in FIG. 13, a contact portion structure symmetric to the bearing 13 side is provided at the bearing 14 side, likewise FIG. 10.

As shown in the drawing, the contact portion of anti-scattering tube 67 includes a tapered portion 67a having the inner diameter increased in the direction from the end face of magnet 16 to the end face of anti-scattering tube 67. The contact portion of assembly flange 58 includes an engagement portion 58a engaging with and longer than tapered portion 67a. In other words, engagement portion 58a of assembly flange 58 takes a structure to be inserted into anti-scattering tube 67 to form contact.

Externally applied axial force F according to the contact portion structure of the third embodiment causes engagement portion 58a of assembly flange 58 to wedge into anti-scattering tube 67, i.e. by the wedge effect, to increase the inner diameter of anti-scattering tube 67 at the end face. In the other words, the structure converts axial force F into force P acting in the direction to increase the diameter. According to this structure, the difference in inner diameter displacement of anti-scattering tube 67 is reduced to alleviate the bending stress on magnet 16. Further, the alignment between assembly flange 58 and anti-scattering tube 67 is facilitated by virtue of the wedge effect.

In second motor 21 set forth above, axial force F is applied during the mounting stage to the housing, which reduces the difference in the inner diameter variation caused by press-fitting into the anti-scattering tube to reduce the bending stress on magnet 16. Therefore, bending at the anti-scattering tube, even if occurred prior to mounting in the housing, can be improved by axial force F. The step of applying axial force F may be conducted prior to mounting in the housing, i.e. assembly may be first conducted while applying axial force F to the anti-scattering tube and the assembly flange.

Figure 14:
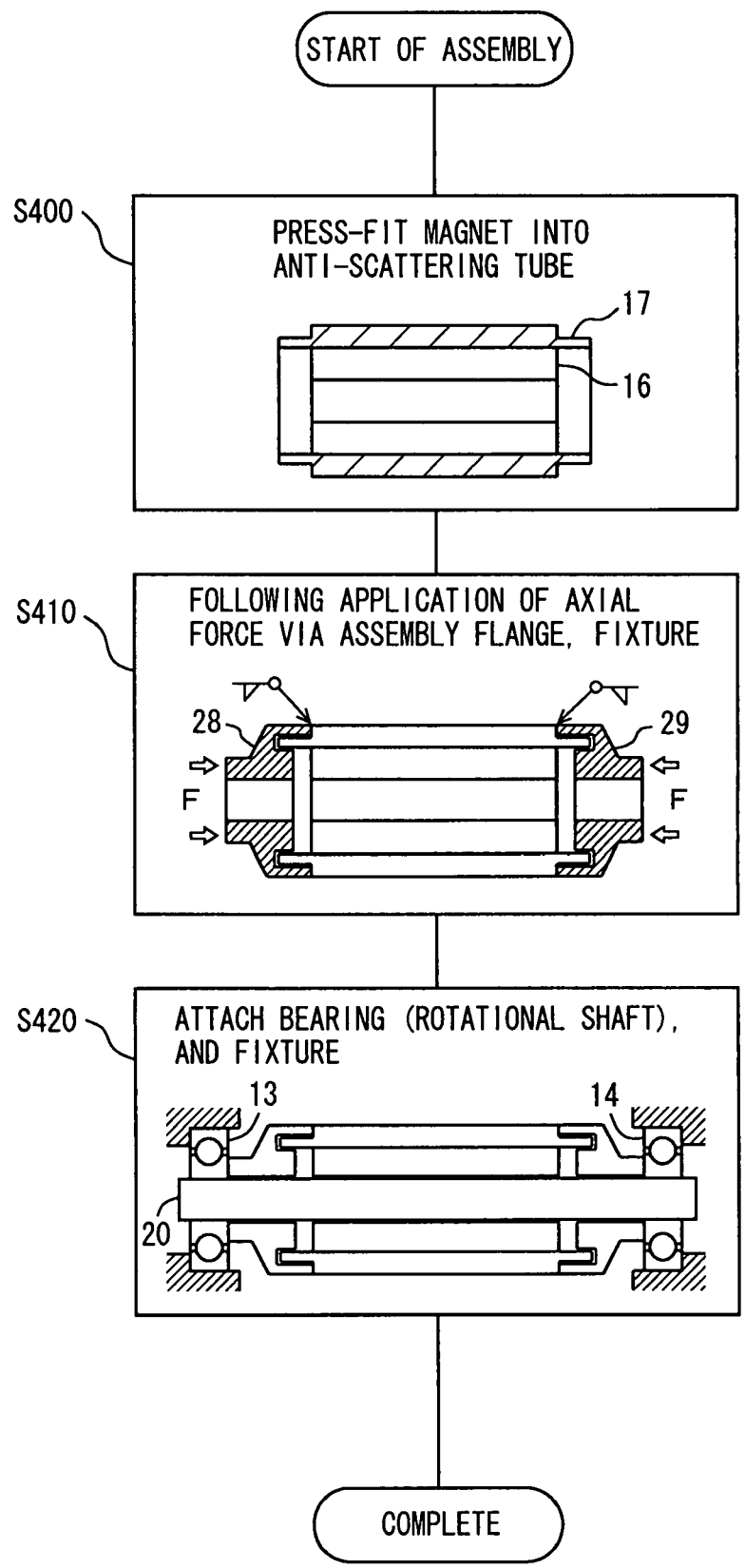
FIG. 14 is a process chart of assembly steps of a rotor.

FIG. 14 is a process chart of assembly steps of rotor 25 corresponding to the fabrication method of motor 21. As shown in the drawing, magnet 16 is press-fitted into anti-scattering tube 17 (step S400). Then, anti-scattering tube 17 with magnet 16 is clamped by assembly flanges 28 and 29 at both ends, and assembly flanges 28 and 29 and anti-scattering tube 17 are welded for fixture while axial force F is applied from both ends (step S410). Rotational shaft 20 and bearings 13 and 14 are attached to the assembly under a state where internal compression stress remains, and mounted in the housing (step S420) to complete the assembly of rotor 25. The advantage of reducing the bending stress on magnet 16 can be provided even in the case where the step of applying axial force F is conducted prior to mounting in the housing. Further, the bending of the anti-scattering tube can be improved in advance.

C. Modification:

The third embodiment (FIG. 13) of second motor 21 of the present invention is based on a structure in which the inner diameter of anti-scattering tube 67 is increased at the end face taking advantage of the tapered configuration. A flat configuration may be employed instead of the inclination of the tapered configuration. In other words, the portion of assembly flange wedged into the anti-scattering tube may take a simple cylindrical configuration. This structure will be described hereinafter.

FIG. 15 is a partial sectional view of a structure of a modification of the contact portion of the assembly flange and anti-scattering tube. As shown in the drawing, the contact portion of assembly flange 68 includes a cylinder portion 68a having an outer diameter substantially equal to that of magnet 16. The contact portion of anti-scattering tube 77 has no particular structure provided, remaining in the cylindrical configuration with the press-fit margin for allowing magnet 16 to be press-fitted. Likewise FIGS. 11 and 13, only the structure on the part of bearing 13 is indicated in this modification, and the structure on the part of bearing 14 is not shown.

In this contact portion structure, press-fitting force FA is applied to assembly flange 68 as externally applied axial force F. The press-fit force FA causes cylinder portion 68a of assembly flange 68 to be pushed in to be located at both ends of anti-scattering tube 77. In this contact portion structure, force P acts in a direction to increase the inner diameter of anti-scattering tube 77 at the end by the press-fitting of assembly flange 68, whereby the displacement difference in the direction of the inner diameter can be suppressed over the entire length of anti-scattering tube 77. Therefore, the bending stress on magnet 16 can be alleviated.

Since the outer configuration of magnet 16 and assembly flange 68 are substantially equal in the contact portion structure, the press-fitting force of anti-scattering tube 77 on magnet 16 can be utilized.

Figure 16:
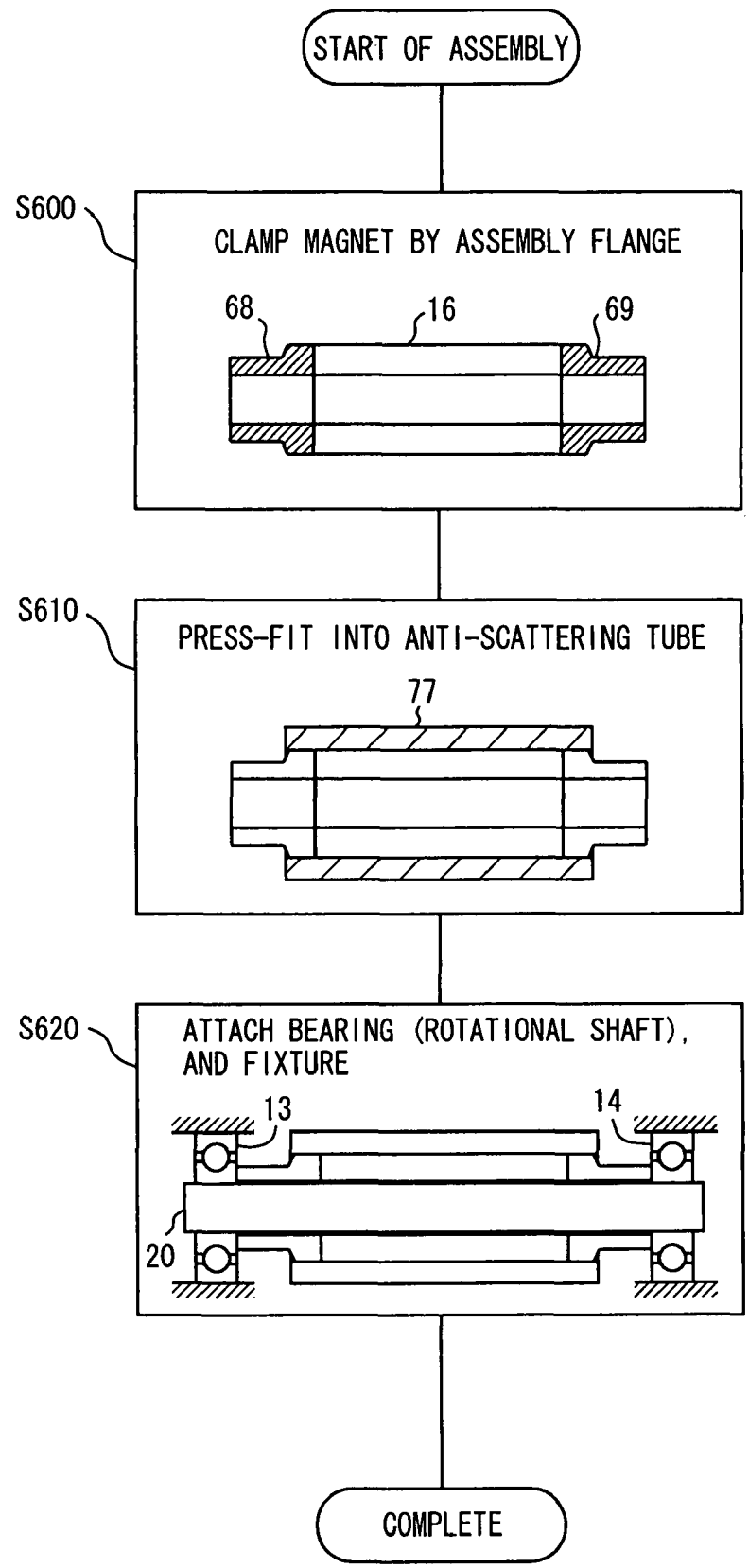
FIG. 16 is a process chart of assembly steps of a rotor.

FIG. 16 is a process chart of assembly steps of a rotor having the contact portion structure shown in FIG. 15. As shown in the drawing, magnet 16 is clamped at both ends by assembly flanges 68 and 69 (step S600). The clamp through assembly flanges 68 and 69 is favorably conducted to form a unitary piece by means of a jig, adhesive, or the like.

Then, the assembly with assembly flanges 68 and 69 and magnet 16 together is press-fitted into anti-scattering tube 77 (step S610.) By this press-fitting, magnet 16 is located up to the end of anti-scattering tube 77. In other words, the inner diameter of anti-scattering tube 77 at the end (the portion corresponding to projection portions 17b and 17c described for first motor 10) is increased in diameter, similar to the portion having magnet 16 disposed inside.

Rotational shaft 20 is inserted into the inner cylindrical portion of assembly flanges 68 and 69 and magnet 16 fastened with anti-scattering tube 77, and mounted in the housing together with bearings 13 and 14 (step S620) to complete the assembly of the rotor. By virtue of this fabrication method, the rotor can be assembled with one press-fitting step without having to apply the press-fitting force repeatedly. Therefore, an efficient fabrication method of a rotor having the number of steps reduced can be realized.

Figure 17:
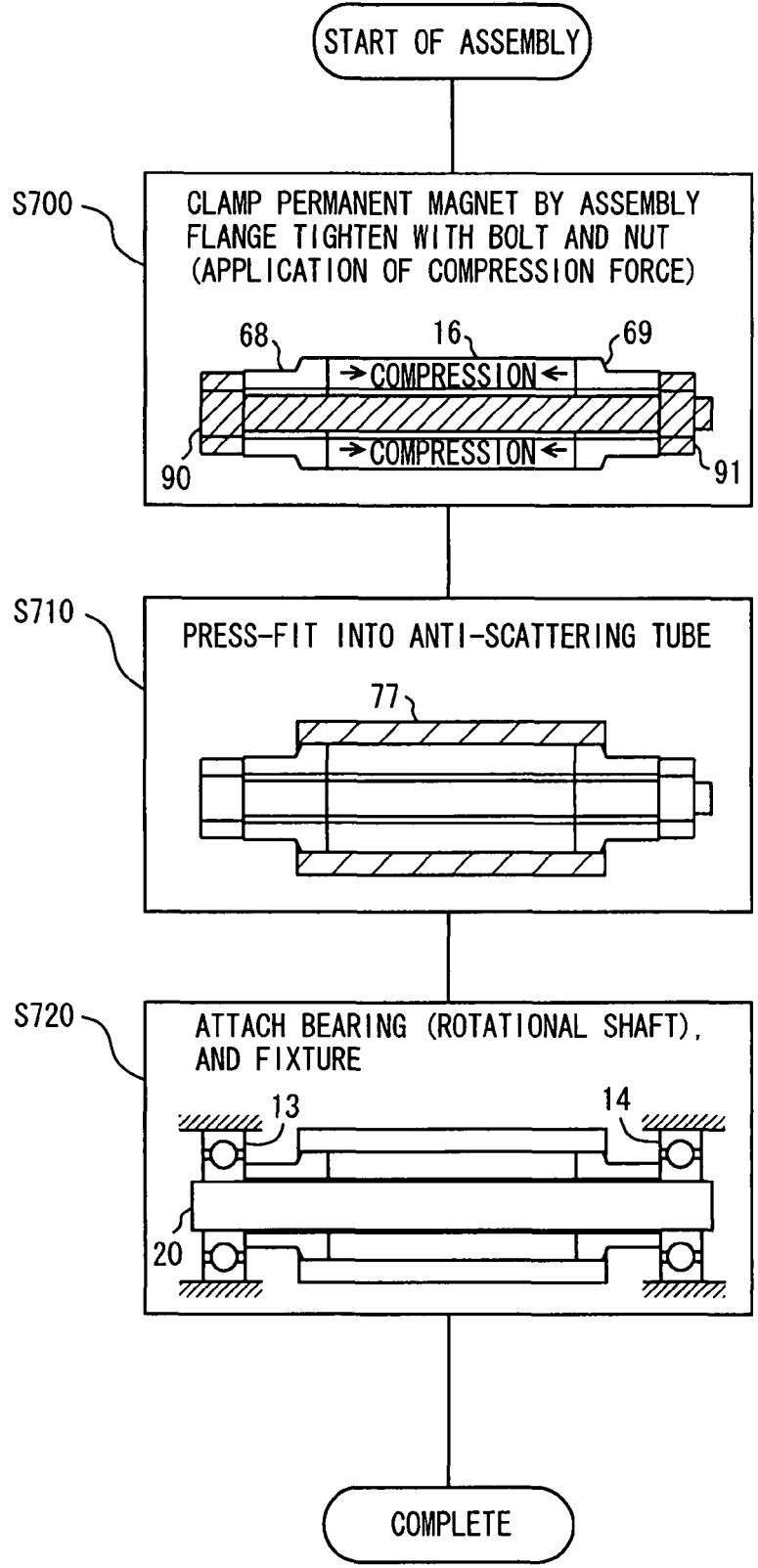
FIG. 17 is a process chart of assembly steps of a rotor.

The clamping by assembly flanges 68 and 69 at step S600 may be effected using the tightening force of a bolt and a nut. FIG. 17 is a process chart of the assembly steps of a rotor having the contact portion structure shown in FIG. 15. As shown in the drawing, an assembly bolt 90 is inserted through assembly flanges 68 and 69, tightened by an assembly nut 91 to clamp assembly flanges 68 and 69 under a state with compression force applied to magnet 16 by the tightening force (step S700).

The integrated assembly is press-fitted into anti-scattering tube 77 and secured (step S710). At this step, assembly flanges 68 and 69 and magnet 16 in a state having compression force applied are fixed with anti-scattering tube 77.

Then, assembly bolt 90 and assembly nut 91 are removed from magnetic 16 and assembly flanges 68 and 69 that are fixed by press-fitting, and rotational shaft 20 is inserted to be mounted together with bearings 13 and 14 in the housing (step S720). Thus, the assembly of the rotor is completed.

By employing this fabrication method, the displacement difference in the direction of the inner diameter of anti-scattering tube 77 is reduced to alleviate the bending stress on magnet 16. Further, by applying the compression force to magnet 16 per se, the bending stress acting all over magnet 16 (the tensile stress by bending) can be suppressed.

The surface magnet type motor described above is employed to assist rotation of a turbine shaft in an engine with a turbocharger. FIG. 18 is a schematic diagram of a system including a surface magnet type motor for an engine that includes a turbocharger as the supercharger.

As shown in the drawing, this system is mainly configured of an engine 100 including an inlet pipe 101 and an exhaust pipe 102, a turbocharger 110 including a wheel in inlet pipe 101 and exhaust pipe 102, a surface magnet type motor 120 arranged coaxially with turbocharger 110, an inverter 130, and an ECU 140 providing control of the entire system such as for engine 100, turbocharger 110, and the like. Surface magnet type motor 120 herein may be first motor 10 or second motor 21.

In this system, the energy of the exhaust output from engine 100 causes rotation of the turbine wheel that is the wheel at the exhaust pipe 102 side. By this power, the compressor wheel that is the wheel at the exhaust pipe 101 side is rotated. Accordingly, compressed air can be supplied to engine 100 to improve the charging efficiency. In this system including surface magnet type motor 120, the turbine shaft that couples the turbine wheel and the compressor wheel is forced to rotate when the energy of the exhaust is not sufficient. The electric power to surface magnet type motor 120 is supplied via inverter 130 under control of ECU 140. A bypass with respect to the turbine wheel is provided at exhaust pipe 102. A waste gate valve 115 is arranged in the proximity of the entrance of the bypass. In the case where supercharging is not required, control to open waste gate valve 115 is effected.

As a system including a motor employed in the assist of a turbine shaft that requires high speed rotation, a system having the motor arranged on a shaft different from the turbine shaft for transmitting power to the turbine shaft, or a system that has a one way clutch installed to prevent the following rotation of the turbine shaft can be assumed. The allowable rotation speed of the motor can be suppressed at a low level by employing such a system. However, it is difficult to configure a power transmission mechanism or one way clutch that can correspond to a turbine shaft that operates at a high rotation speed of several hundred thousands rpm. Such a system cannot be realized easily.

In contrast, the surface magnet type motor of the present invention can accommodate high speed rotation, and can be arranged coaxial to the turbine shaft for the assist of the turbine shaft. In other words, the surface magnet type motor of the present invention can accommodate relatively readily a system in which high speed rotation is required.

Although embodiments of the present invention have been described as set forth above, the present invention is not limited to such embodiments, and may be embodied in various forms without departing from the spirit of the present invention. In the embodiments, the structure of the projection portion of the anti-scattering tube, the application of axial force to the anti-scattering tube, the application of compression force to the magnet per se, the structure of reducing stress on the magnet, the fabrication method, and the like have been described individually. Similar advantages can be provided by applying such various structures and fabrication method in combination.

The invention claimed is:

1. A surface magnet type motor having a magnet at a surface of a rotor, comprising:
    an anti-scattering tube formed in a cylindrical configuration longer in length than said magnet mounted at said rotor in an axial direction, and having said magnet press-fitted therein for preventing scattering of the magnet, and
    a stress alleviation portion alleviating stress generated at an end of said magnet press-fitted into said anti-scattering tube, wherein
    said stress alleviation portion is provided at a projection portion that is a portion of said anti-scattering tube and protruding from each of both end faces of said press-fitted magnet,
    a displacement difference in a direction of an inner diameter generated between said projection portion and a portion excluding said projection portion by said press-fitting is suppressed by forming said projection portion in lower rigidity than said portion excluding the projection portion.

2. The surface magnet type motor according to claim 1, wherein said configuration of suppressing the difference achieves lower rigidity by forming a notch of a predetermined depth at an outer circumference of said projection portion.

3. A fabrication method of a surface magnet type motor having a magnet at a surface of a rotor, comprising:
    step (a) of forming an anti-scattering tube according to the anti-scattering tube of claim 1, covering the surface of the magnet at said rotor to prevent scattering of the magnet, in a cylindrical configuration longer in length than said magnet in an axial direction, and
    step (b) of press-fitting said magnet into said anti-scattering tube while constituting a stress alleviation portion alleviating stress generated at an end of said magnet stored in said anti-scattering tube,
    wherein said step (b) includes step (b21) of clamping said magnet at both ends by an assembly flange, step (b22) of press-fitting said magnet and said assembly flange integrally into said anti-scattering tube, and step (b23) of, after said step (b22), attaching said rotational shaft and bearing to said anti-scattering tube to mount the rotor in a housing of said surface magnet type motor.

4. A fabrication method of a surface magnet type motor having a magnet at a surface of a rotor, comprising:

step (a) of forming an anti-scattering tube according to the anti-scattering tube of claim 1, covering the surface of the magnet at said rotor to prevent scattering of the magnet, in a cylindrical configuration longer in length than said magnet in an axial direction, and step (b) of press-fitting said magnet into said anti-scattering tube while constituting a stress alleviation portion alleviating stress generated at an end of said magnet stored in said anti-scattering tube, wherein said step (b) includes step (b31) of clamping said magnet at both ends by an assembly flange in a state of axial force applied to said magnet in a direction of the rotational shaft, step (b32) of press-fitting said magnet and said assembly flange in a state having said axial force applied integrally into said anti-scattering tube, and step (b33) of attaching a rotational shaft and bearing to said anti-scattering tube with said magnet and said assembly flange to mount the rotor in a housing of said surface magnet type motor.

5. The fabrication method of a surface magnet type motor according to claim 4, wherein said step (b31) has a step of passing an assembly bolt through said magnet and said assembly flange to apply axial force by tightening an assembly nut.

6. The surface magnet type motor according to claim 1, wherein a configuration of suppressing the difference achieves lower rigidity by forming said projection portion thinner than said portion excluding the projection portion.

7. A surface magnet type motor having a magnet at a surface of a rotor, comprising:

an anti-scattering tube formed in a cylindrical configuration longer in length than said magnet mounted at said rotor in an axial direction, and having said magnet press-fitted therein for preventing scattering of the magnet, and a stress alleviation portion alleviating stress generated at an end of said magnet press-fitted into said anti-scattering tube, wherein said stress alleviation portion is provided at a projection portion that is a portion of said anti-scattering tube and protruding from each of both end faces of said press-fitted magnet, a displacement difference in a direction of an inner diameter generated between said projection portion and a portion excluding said projection portion by said press-fitting is suppressed by forming a tapered configuration having an inner diameter of said projection portion increased more than the inner diameter of said portion excluding the projection portion.

8. A surface magnet type motor having a magnet at a surface of a rotor, comprising:

an anti-scattering tube formed in a cylindrical configuration longer in length than said magnet mounted at said rotor in an axial direction, and having said magnet press-fitted therein for preventing scattering of the magnet, and a stress alleviation portion alleviating stress generated at an end of said magnet press-fitted into said anti-scattering tube, wherein said stress alleviation portion is provided at a projection portion that is a portion of said anti-scattering tube and protruding from each of both end faces of said press-fitted magnet, a displacement difference in a direction of an inner diameter generated between said projection portion and a portion excluding said projection portion by said press-fitting is suppressed by forming said projection portion in a configuration having a diameter increased conically.

9. A surface magnet type motor having a magnet at a surface of a rotor, comprising:

an anti-scattering tube formed in a cylindrical configuration longer in length than said magnet mounted at said rotor in an axial direction, and having said magnet press-fitted therein for preventing scattering of the magnet, a stress alleviation portion alleviating stress generated at an end of said magnet press-fitted into said anti-scattering tube, and an assembly flange between a bearing to be attached to said rotational shaft and each end face of said magnet, wherein said stress alleviation portion is provided at a contact portion where a projection portion that is a portion of said anti-scattering tube protruding from each end face of said press-fitted magnet is brought into contact with said assembly flange, and takes a configuration of suppressing a displacement difference in a direction of an inner diameter generated between said projection portion and a portion excluding said projection portion by press-fitting through application of external force in the direction of the rotational shaft from both outer sides of said assembly flange, wherein said contact portion takes a configuration of converting the external force from said assembly flange into axial force imposed on said anti-scattering tube at an outer circumference side than at an inner circumference of said anti-scattering tube.

10. The surface magnet type motor according to claim 9, wherein a contact portion of said anti-scattering tube takes a salient configuration in contact with said assembly flange at an outer circumferential side end face of said anti-scattering tube.

11. The surface magnet type motor according to claim 9, wherein a contact portion of said assembly flange takes a salient configuration in contact with an outer circumference side end face of said anti-scattering tube.

12. The surface magnet type motor according to claim 9, wherein the contact portion of said anti-scattering tube is formed in a cylindrical configuration smaller than an outside diameter of said portion excluding the projection portion to set said anti-scattering tube entirely in a step-graded cylindrical configuration, and forming a contact portion of said assembly flange in a configuration brought into contact with a shoulder portion of said step-graded cylindrical configuration.

13. A surface magnet type motor having a magnet at a surface of a rotor, comprising:

an anti-scattering tube formed in a cylindrical configuration longer in length than said magnet mounted at said rotor in an axial direction, and having said magnet press-fitted therein for preventing scattering of the magnet, a stress alleviation portion alleviating stress generated at an end of said magnet press-fitted into said anti-scattering tube, and an assembly flange between a bearing to be attached to said rotational shaft and each end face of said magnet, wherein said stress alleviation portion is provided at a contact portion where a projection portion that is a portion of said anti-scattering tube protruding from each end face of said press-fitted magnet is brought into contact with said assembly flange, and takes a configuration of suppressing a displacement difference in a direction of an inner diameter generated between said projection portion and a portion excluding said projection portion by press-fitting through application of external force in the direction of the rotational shaft from both outer sides of said assembly flange, wherein said contact portion takes a configuration of converting external force from said assembly flange into a force acting in a direction to increase the inner diameter of said projection portion, wherein said contact portion of said anti-scattering tube is formed in a tapered configuration having the inner diameter of said projection portion increased than the inner diameter of said portion excluding the projection portion, and forming a contact portion of said assembly flange in a configuration engaging with said tapered configuration.

14. The surface magnet type motor according to claim 13, wherein said contact portion of said assembly flange is formed in a cylindrical configuration having an outer diameter substantially equal to an outer diameter of said magnet, being press-fitted into said projection portion of said anti-scattering tube.

15. A fabrication method of a surface magnet type motor having a magnet at a surface of a rotor, comprising:

step (a) of forming an anti-scattering tube, covering the surface of the magnet at said rotor to prevent scattering of the magnet, in a cylindrical configuration longer in length than said magnet in an axial direction, and step (b) of press-fitting said magnet into said anti-scattering tube while constituting a stress alleviation portion alleviating stress generated at an end of said magnet stored in said anti-scattering tube, wherein said step (b) includes step (b1) of press-fitting said magnet into said anti-scattering tube to form a projection portion protruding from each of both end faces of said magnet, step (b2) of attaching an assembly flange to said projection portion to clamp said anti-scattering tube by said assembly flange, and step (b3) of, after said step (b2), attaching a rotational shaft and bearing to said anti-scattering tube while applying axial force to said anti-scattering tube in a direction of the rotational shaft via said bearing to mount said rotor in a housing of said surface magnet type motor.

16. A fabrication method of a surface magnet type motor having a magnet at a surface of a rotor, comprising:

step (a) of forming an anti-scattering tube, covering the surface of the magnet at said rotor to prevent scattering of the magnet, in a cylindrical configuration longer in length than said magnet in an axial direction, and step (b) of press-fitting said magnet into said anti-scattering tube while constituting a stress alleviation portion alleviating stress generated at an end of said magnet stored in said anti-scattering tube, wherein said step (b) includes step (b11) of press-fitting said magnet into said anti-scattering tube to form a projection portion protruding from each of both end faces of said magnet, step (b12) of attaching an assembly flange to said projection portion for fixture while applying axial force to said anti-scattering tube in a direction of the rotational shaft, and step (b13) of, after said step (b12), attaching a rotational shaft and bearing to said anti-scattering tube to which said axial force is applied to mount the rotor in a housing of said surface magnet type motor.

17. A surface magnet type motor having a magnet at a surface of a rotor, comprising:

an anti-scattering tube formed in a cylindrical configuration that opens at both axial ends and is longer in length than said magnet mounted at said rotor in an axial direction, and having said magnet press-fitted therein for preventing scattering of the magnet, and a stress alleviation portion alleviating stress generated at an end of said magnet press-fitted into said anti-scattering tube, wherein each of said stress alleviation portion protrudes from a respective end face of said press-fitted magnet, taking a configuration of suppressing a displacement difference in a direction of an inner diameter generated between said projection portion and a portion excluding said projection portion by said press-fitting, said stress alleviation portion takes a configuration of suppressing said difference by forming said projection portion in lower rigidity than said portion excluding the projection portion, wherein said configuration of suppressing the difference achieves lower rigidity by forming said projection portion thinner than said portion excluding the projection portion, the projection portion has an inner diameter same as an inner diameter of the cylindrical configuration excluding the projection portion and a reduced outer diameter as compared to an outer diameter of the cylindrical configuration excluding the projection portion.

18. A fabrication method of a surface magnet type motor having a magnet at a surface of a rotor, comprising:

step (a) of forming an anti-scattering tube, covering the surface of the magnet at said rotor to prevent scattering of the magnet, in a cylindrical configuration longer in length than said magnet in an axial direction, and step (b) of press-fitting said magnet into said anti-scattering tube while constituting a stress alleviation portion alleviating stress generated at an end of said magnet stored in said anti-scattering tube, wherein said step (b) includes step (b1) of press-fitting said magnet into said anti-scattering tube to form a projection portion protruding from each of both end faces of said magnet, the projection portion has an inner diameter the same as an inner diameter of the cylindrical configuration excluding the projection portion and a reduced outer diameter as compared to an outer diameter of the cylindrical configuration excluding the projection portion, step (b2) of attaching an assembly flange to said projection portion to clamp said anti-scattering tube by said assembly flange, and step (b3) of, after said step (b2), attaching a rotational shaft and bearing to said anti-scattering tube while applying axial force to said anti-scattering tube in a direction of the rotational shaft via said bearing to mount said rotor in a housing of said surface magnet type motor.

* * * * *

UNITED STATES PATENT AND TRADEMARK OFFICE
CERTIFICATE OF CORRECTION

| | | |
|---|---|---|
| PATENT NO. | : 7,830,058 B2 | Page 1 of 1 |
| APPLICATION NO. | : 11/666754 | |
| DATED | : November 9, 2010 | |
| INVENTOR(S) | : Tomoyuki Maeda | |

It is certified that error appears in the above-identified patent and that said Letters Patent is hereby corrected as shown below:

| Column | Line | |
|---|---|---|
| 17 | 5 | Change "said rotational" to --a rotational--. |
| 19 | 20 | After "increased" insert --more--. |

Signed and Sealed this
Tenth Day of May, 2011

David J. Kappos
*Director of the United States Patent and Trademark Office*